(12) United States Patent
Vorenkamp et al.

(10) Patent No.: US 8,427,330 B2
(45) Date of Patent: Apr. 23, 2013

(54) EFFICIENCY INDICATOR FOR INCREASING EFFICIENCY OF WIRELESS POWER TRANSFER

(75) Inventors: Pieter Vorenkamp, Laguna Niguel, CA (US); Reinier Van Der Lee, Lake Forest, CA (US); InSun Van Loo, Wijchen (NL)

(73) Assignee: Broadcom Corporation, Irvine, CA (US)

( * ) Notice: Subject to any disclaimer, the term of this patent is extended or adjusted under 35 U.S.C. 154(b) by 791 days.

(21) Appl. No.: 12/580,353

(22) Filed: Oct. 16, 2009

(65) Prior Publication Data

US 2010/0201513 A1 Aug. 12, 2010

Related U.S. Application Data

(63) Continuation-in-part of application No. 12/421,762, filed on Apr. 10, 2009.

(60) Provisional application No. 61/150,554, filed on Feb. 6, 2009.

(51) Int. Cl.
*G08B 21/00* (2006.01)

(52) U.S. Cl.
USPC ............ 340/636.2; 340/539.13; 320/108; 320/107; 455/41.2; 455/573; 455/343.1

(58) Field of Classification Search ............ 320/108, 320/107; 455/41.1–41.2, 573, 343.1, 343.2, 455/343.5, 343.6; 340/636.1, 636.19, 636.2, 340/686.6, 539.13, 572.1, 10.1, 10.34
See application file for complete search history.

(56) References Cited

U.S. PATENT DOCUMENTS

| | | | |
|---|---|---|---|
| 3,938,018 A | 2/1976 | Dahl | |
| 4,873,677 A | 10/1989 | Sakamoto et al. | |
| 5,455,466 A | 10/1995 | Parks et al. | |
| 5,734,254 A | 3/1998 | Stephens | |
| 5,812,643 A | 9/1998 | Schelberg et al. | |
| 5,952,814 A | 9/1999 | Van Lerberghe | |
| 5,959,433 A | 9/1999 | Rohde | |
| 6,067,008 A | 5/2000 | Smith | |
| 6,114,832 A | 9/2000 | Lappi et al. | |
| 6,275,143 B1 | 8/2001 | Stobbe | |
| 6,384,578 B1 * | 5/2002 | Patino et al. | 320/149 |
| 6,463,305 B1 * | 10/2002 | Crane | 455/566 |
| 6,756,765 B2 | 6/2004 | Bruning | |
| 7,009,362 B2 * | 3/2006 | Tsukamoto et al. | 320/107 |
| 7,042,196 B2 | 5/2006 | Ka-Lai et al. | |
| 7,375,492 B2 | 5/2008 | Calhoon et al. | |

(Continued)

*Primary Examiner* — George Bugg
*Assistant Examiner* — Anne Lai
(74) *Attorney, Agent, or Firm* — Fiala & Weaver P.L.L.C.

(57) ABSTRACT

Techniques are described herein that are capable of using an efficiency indicator for increasing efficiency of a wireless power transfer. A wireless power transfer system includes features that allow the system to be deployed in public spaces such as airports or in commercial establishments such as restaurants or hotels to allow a user to recharge one or more portable electronic devices while away from home. The system may provide an efficiency indicator to a portable electronic device that specifies a recommended position of the portable electronic device. The recommended position may correspond to an efficiency with respect to the wireless power transfer that is greater than an efficiency with respect to the wireless power transfer that corresponds to a position of the portable electronic device. The portable electronic device may generate a sensory signal that indicates the recommended position with reference to the position of the portable electronic device.

25 Claims, 17 Drawing Sheets

U.S. PATENT DOCUMENTS

| | | |
|---|---|---|
| 7,378,817 B2 | 5/2008 | Calhoon et al. |
| 7,683,572 B2 * | 3/2010 | Toya ............................ 320/108 |
| 7,750,598 B2 * | 7/2010 | Hoffman et al. ............. 320/107 |
| 7,786,419 B2 * | 8/2010 | Hyde et al. ................. 250/201.1 |
| 8,004,235 B2 | 8/2011 | Baarman et al. |
| 8,060,011 B2 | 11/2011 | Jin |
| 8,103,313 B2 * | 1/2012 | Enmei ........................... 455/566 |
| 2004/0145342 A1 | 7/2004 | Lyon |
| 2005/0127869 A1 | 6/2005 | Calhoon et al. |
| 2005/0134213 A1 | 6/2005 | Takagi et al. |
| 2007/0082715 A1 | 4/2007 | Rofougaran et al. |
| 2007/0222542 A1 | 9/2007 | Joannopoulos et al. |
| 2007/0228833 A1 | 10/2007 | Stevens et al. |
| 2008/0111518 A1 | 5/2008 | Toya |
| 2008/0197802 A1 | 8/2008 | Onishi et al. |
| 2008/0238364 A1 | 10/2008 | Weber et al. |
| 2008/0258679 A1 * | 10/2008 | Manico et al. ................ 320/106 |
| 2008/0272889 A1 * | 11/2008 | Symons ....................... 340/10.1 |
| 2008/0297107 A1 | 12/2008 | Kato et al. |
| 2009/0096413 A1 * | 4/2009 | Partovi et al. ................ 320/108 |
| 2009/0102296 A1 * | 4/2009 | Greene et al. ................ 307/149 |
| 2009/0133942 A1 | 5/2009 | Iisaka et al. |
| 2009/0134713 A1 | 5/2009 | Stevens et al. |
| 2009/0146608 A1 * | 6/2009 | Lee .............................. 320/108 |
| 2009/0206791 A1 | 8/2009 | Jung |
| 2009/0230777 A1 | 9/2009 | Baarman et al. |
| 2009/0276700 A1 * | 11/2009 | Anderson et al. ............. 715/700 |
| 2009/0284245 A1 | 11/2009 | Kirby et al. |
| 2010/0036773 A1 | 2/2010 | Bennett |
| 2010/0201310 A1 | 8/2010 | Vorenkamp et al. |
| 2010/0201313 A1 | 8/2010 | Vorenkamp et al. |
| 2011/0210696 A1 | 9/2011 | Inoue |

* cited by examiner

EFFICIENCY INDICATOR FOR INCREASING EFFICIENCY OF WIRELESS POWER TRANSFER

CROSS-REFERENCE TO RELATED APPLICATIONS

This application is a continuation-in-part of U.S. patent application Ser. No. 12/421,762, filed Apr. 10, 2009, which claims the benefit of U.S. Provisional Application No. 61/150,554, filed Feb. 6, 2009, the entireties of which are incorporated by reference herein.

BACKGROUND OF THE INVENTION

1. Field of the Invention

The invention generally relates to systems capable of transmitting electrical power without wires.

2. Background

As used herein, the term wireless power transfer refers to a process by which electrical energy is transmitted from a power source to an electrical load without interconnecting wires. Wireless power transfer is useful for applications in which instantaneous or continuous energy transfer is needed, but for which providing a wired connection is inconvenient, hazardous, or impossible.

It has been observed that while electromagnetic radiation (such as radio waves) is excellent for transmitting information wirelessly, it is generally not suitable for transferring power wirelessly. For example, if power were transferred using omnidirectional electromagnetic waves, a vast majority of the power would end up being wasted in free space. Directed electromagnetic radiation such as lasers might be used to transfer power between a power source and a device, but this is not very practical and could even be dangerous. Such an approach would also require an uninterrupted line of sight between the power source and the device, as well as a sophisticated tracking mechanism when the device is mobile.

For the foregoing reasons, conventional systems that transfer power wirelessly are typically based on the concept of electromagnetic induction rather than electromagnetic radiation. These systems include systems based on inductive coupling and systems based on so-called "resonant inductive coupling."

Inductive coupling refers to the transfer of energy from one circuit component to another through a shared electromagnetic field. In inductive coupling, a current running in an emitting coil induces another current in a receiving coil. The two coils are in close proximity, but do not touch.

Inductive coupling has been used in a variety of systems, including but not limited to systems that wirelessly charge a battery in a portable electronic device. In such systems, the portable electronic device is placed in close proximity to a charging station. A first induction coil in the charging station is used to create an alternating electromagnetic field, and a second induction coil in the portable electronic device derives power from the electromagnetic field and converts it back into electrical current to charge the battery. Thus, in such systems, there is no need for direct electrical contact between the battery and the charging station.

Some examples of various different types of charging systems based on the principle of inductive coupling are described in U.S. Pat. No. 3,938,018 to Dahl, entitled "Induction Charging System," U.S. Pat. No. 4,873,677 to Sakamoto et al., entitled "Charging Apparatus for an Electronic Device," U.S. Pat. No. 5,952,814 to Van Lerberghe, entitled "Induction Charging Apparatus and an Electronic Device," U.S. Pat. No. 5,959,433 to Rohde, entitled "Universal Inductive Battery Charger System," and U.S. Pat. No. 7,042,196 to Ka-Lai et al., entitled "Contact-less Power Transfer," each of which is incorporated by reference as if fully set forth herein. Examples of some conventional devices that include batteries that may be recharged via inductive coupling include the Braun Oral B Plak Control Power Toothbrush, the Panasonic Digital Cordless Phone Solution KX-PH15AL and the Panasonic multi-head men's shavers ES70/40 series.

Another example of a technology that supports the use of inductive coupling to wirelessly transfer power is called Near Field Communication (NFC). NFC is a short-range high frequency wireless communication technology that enables the exchange of data between devices over approximately a decimeter distance. NFC is an extension of the ISO/IEC 14443 proximity-card standard that combines the interface of a smartcard and a reader into a single device. An NFC device can communicate with both existing ISO/IEC 14443 smartcards and readers, as well as with other NFC devices, and is thereby compatible with existing contactless infrastructure already in use for public transportation and payment. The air interface for NFC is described in ISO/IEC 18092/ECMA-340: Near Field Communication Interface and Protocol-1 (NFCIP-1) and ISO/IEC 21481/ECMA-352: Near Field Communication Interface and Protocol-2 (NFCIP-2), which are incorporated by reference herein.

NFC devices communicate via magnetic field induction, wherein two loop antennas are located within each other's near field, effectively forming an air-core transformer. In a passive communication mode, an initiator device provides a carrier field and a target device answers by modulating the existing field. In this mode, the target device may draw its operating power from the initiator-provided electromagnetic field.

"Resonant inductive coupling" refers to a more recently-publicized type of inductive coupling that utilizes magnetically-coupled resonators for wirelessly transferring power. In a system that uses resonant inductive coupling, a first coil attached to a sending unit generates a non-radiative magnetic field oscillating at megahertz (MHz) frequencies. The non-radiative field mediates a power exchange with a second coil attached to a receiving unit, which is specially designed to resonate with the field. The resonant nature of the process facilitates a strong interaction between the sending unit and the receiving unit, while the interaction with the rest of the environment is weak. Power that is not picked up by the receiving unit remains bound to the vicinity of the sending unit, instead of being radiated into the environment and lost.

Resonant inductive coupling is said to enable relatively efficient wireless power transfer over distances that are a few times the size of the device to be powered, therefore exceeding the performance of systems based on non-resonant inductive coupling. An example of a wireless power transfer system based on resonant inductive coupling is described in U.S. Patent Application Publication No. 2007/0222542 to Joannopoulos et al., entitled "Wireless Non-radiative Energy Transfer," which is incorporated by reference herein.

Given the explosive growth in the use of portable electronic devices such as laptop computers, cellular telephones, and portable media devices, it is anticipated that there will be a strong demand for systems that facilitate the wireless recharging of power sources based on various types of near field inductive coupling such as those described above. Indeed, it may be deemed desirable to make such systems available in public spaces such as airports or in commercial establishments such as restaurants or hotels to allow users to recharge their portable electronic devices while away from home.

The position (i.e., the orientation and/or the location) of a portable electronic device may affect the efficiency with which the portable electronic device is recharged. Unfortunately, none of the foregoing systems based on inductive coupling or resonant inductive coupling take into consideration the position of a portable electronic device for purposes of increasing the efficiency with which the portable electronic device is recharged. For example, although NFC devices may use magnetic field induction to wirelessly transfer power and/or data, it does not appear that such NFC devices are designed to use the wirelessly transferred power to recharge a power source associated with a portable electronic device, much less to take into consideration the position of the portable electronic device for increasing efficiency of such wireless power transfer.

BRIEF SUMMARY OF THE INVENTION

A system and/or method for using an efficiency indicator for increasing efficiency of a wireless power transfer, substantially as shown in and/or described in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 9:
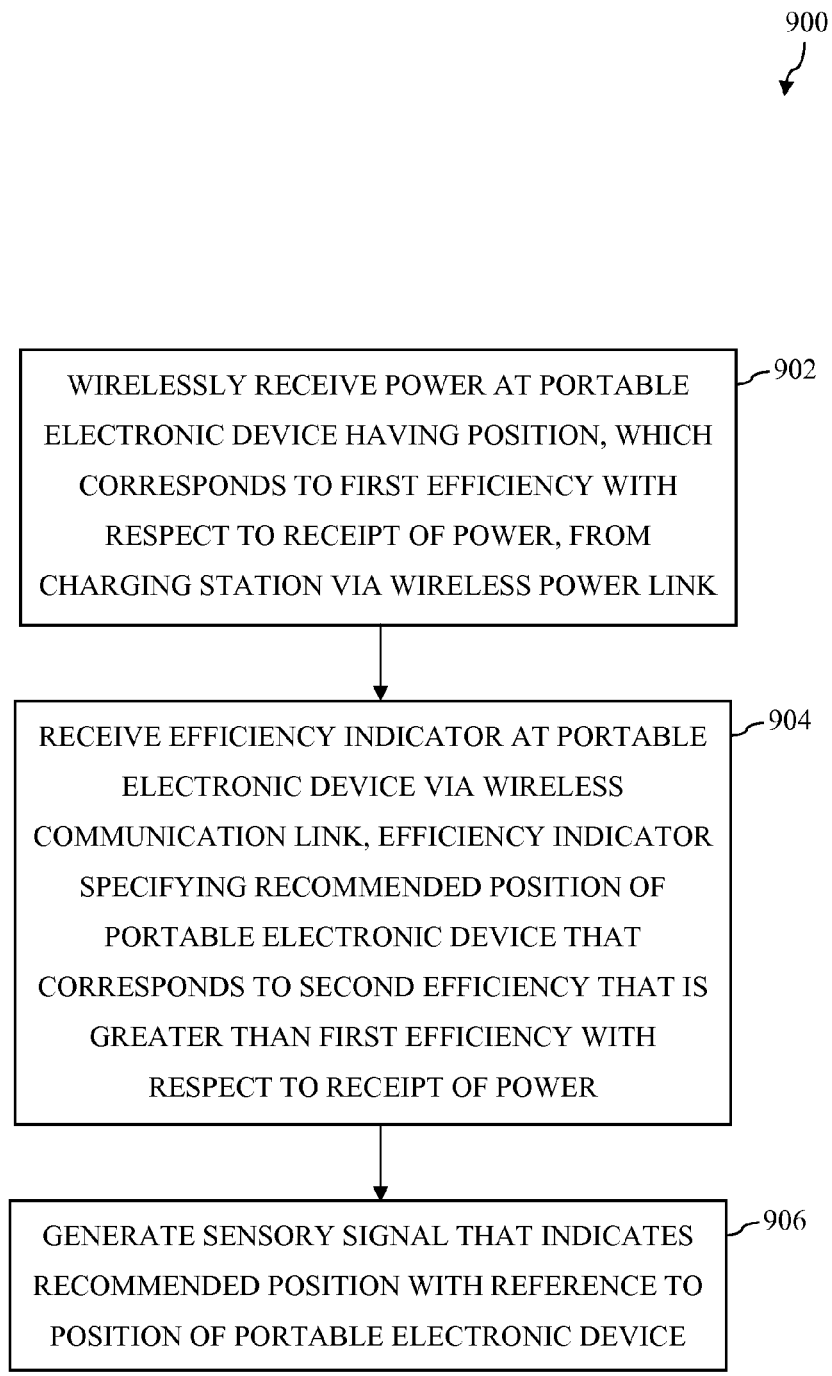
Figure 12:
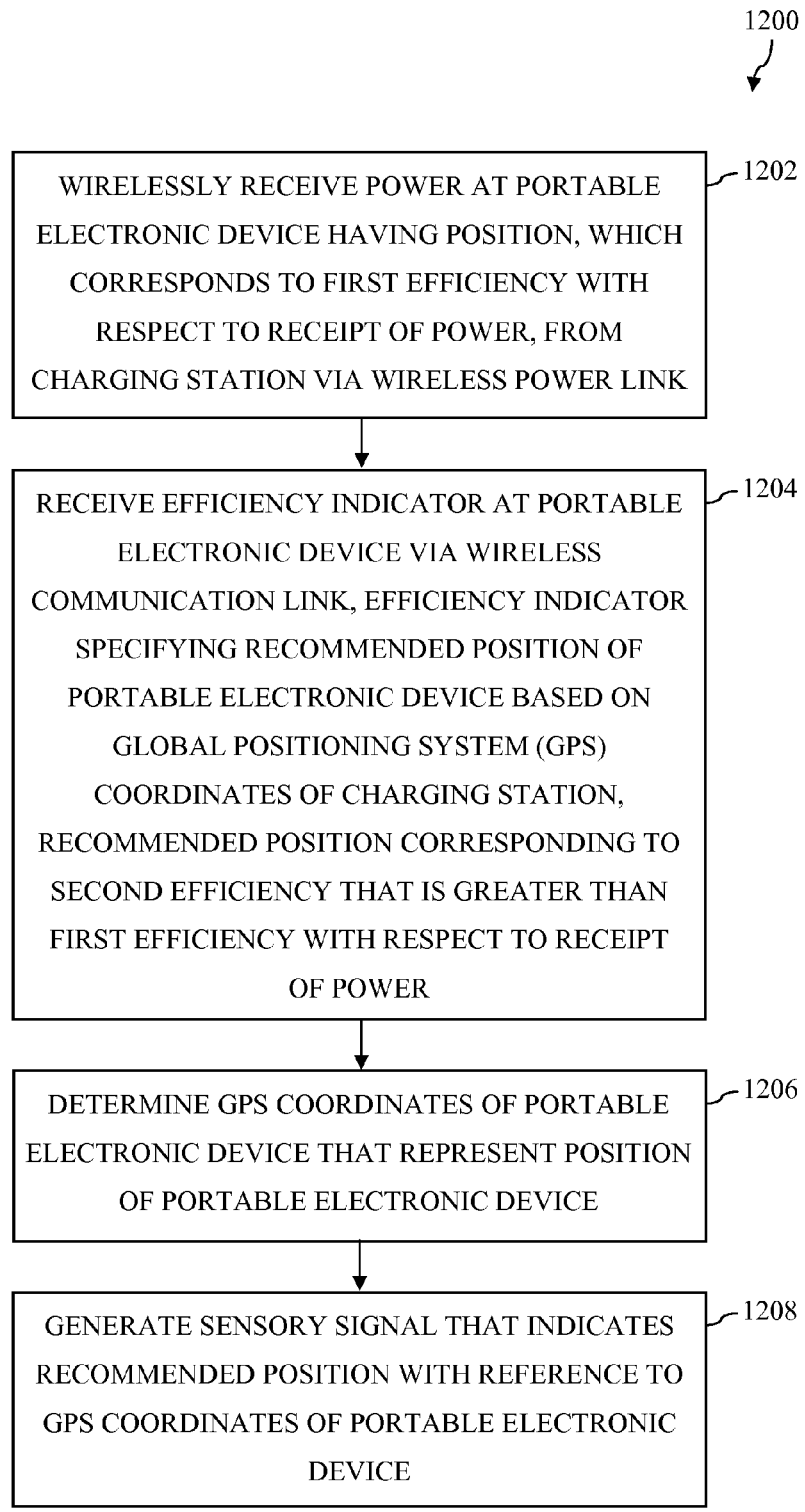
Figure 14:
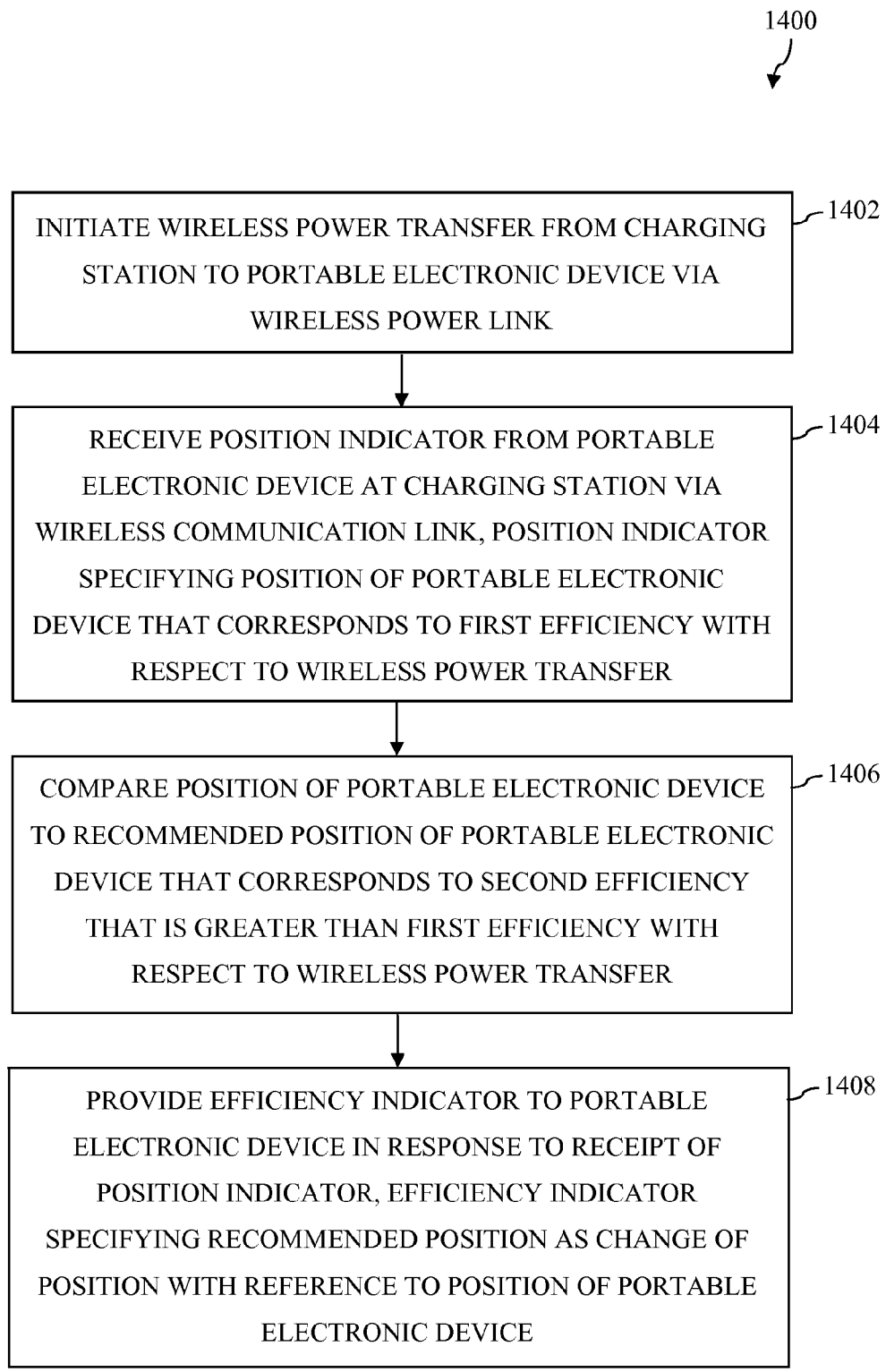

FIGS. 9, 12, and 14 depict flowcharts of methods for using an efficiency indicator for increasing efficiency of a wireless power transfer in accordance with embodiments described herein.

Figure 10:
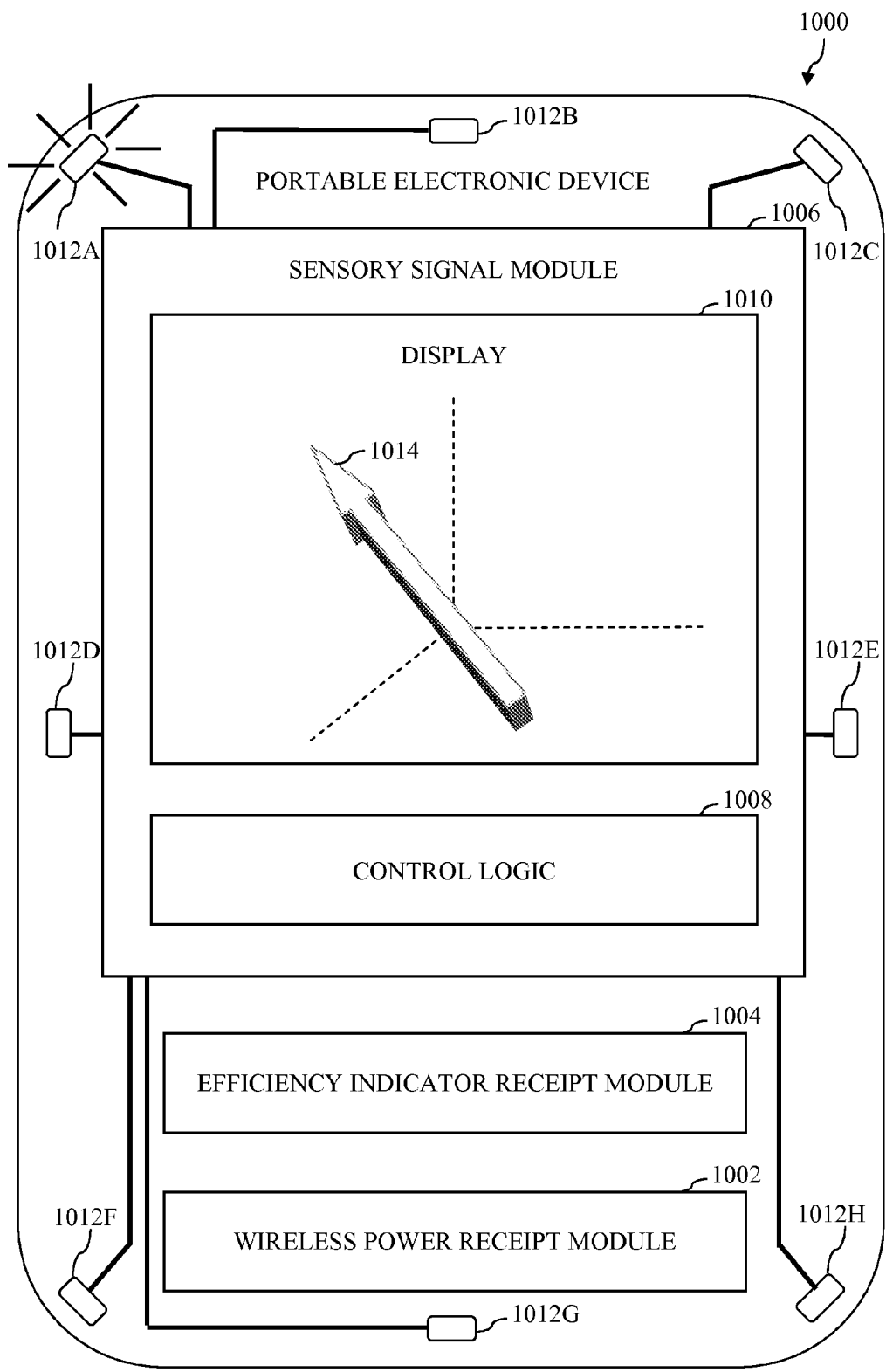
Figure 13:
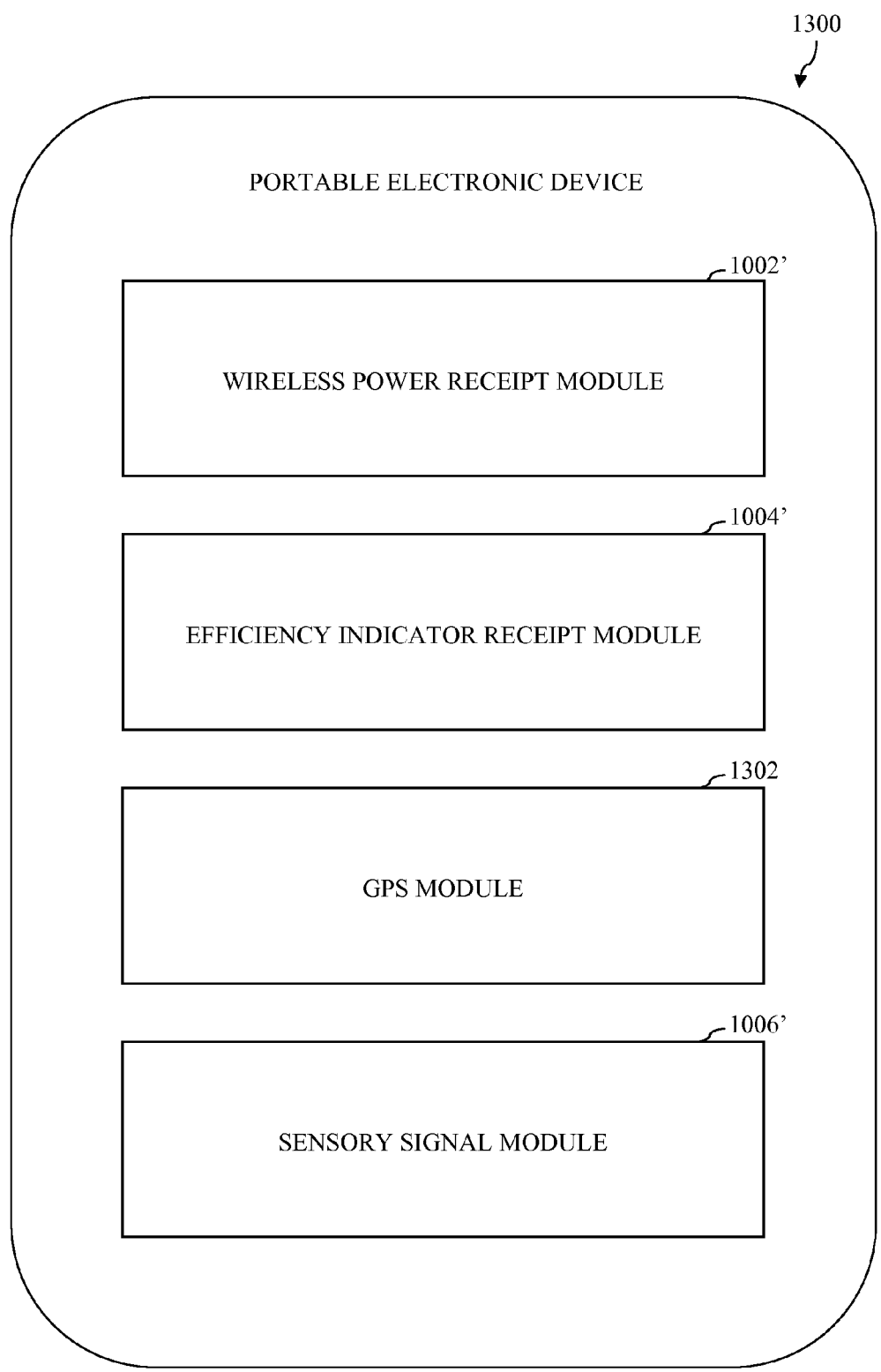

FIGS. 10 and 13 are block diagrams of example implementations of a portable electronic device in accordance with embodiments described herein.

Figure 11:
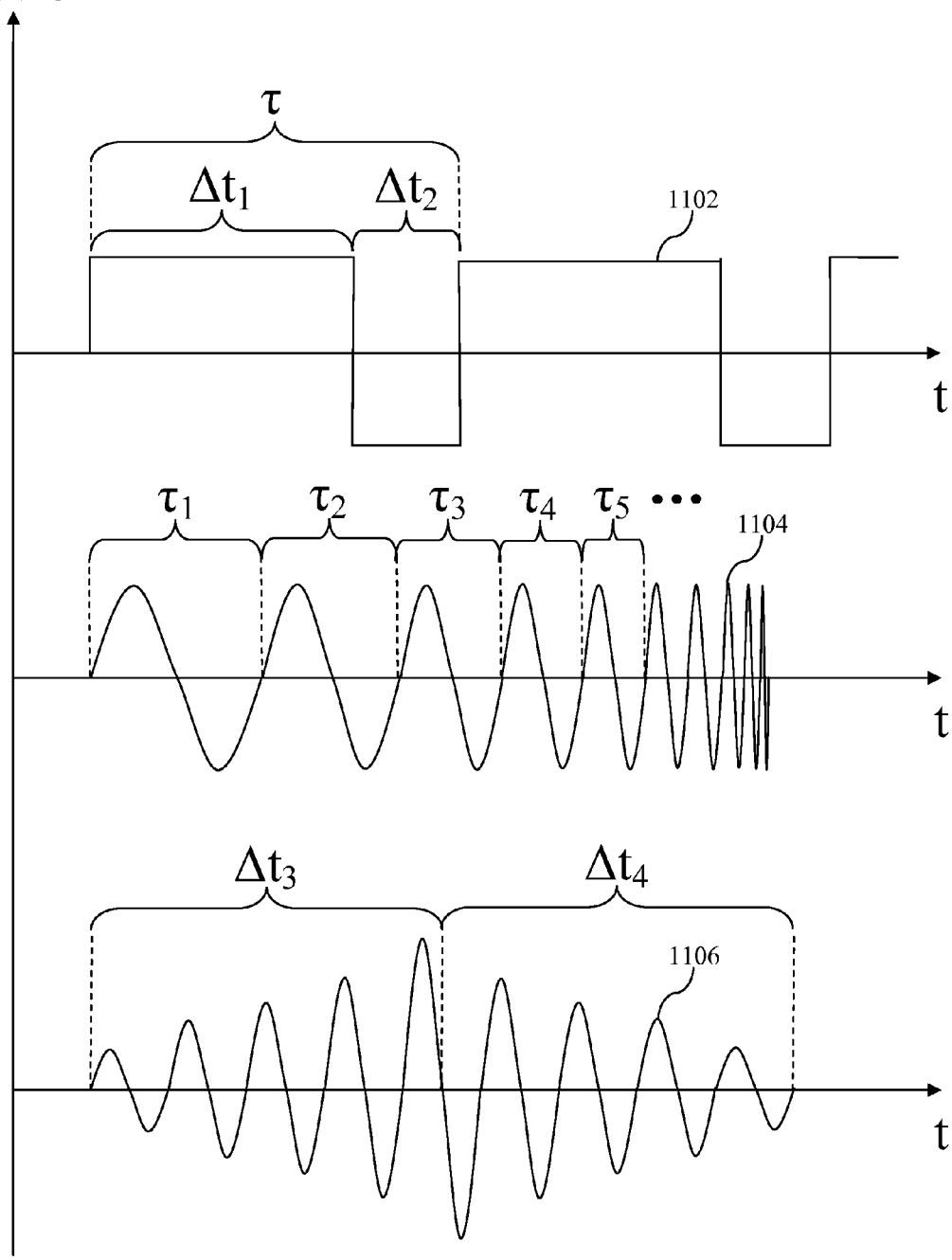

FIG. 11 is a graphical representation of example sensory signals in accordance with embodiments described herein.

Figure 15:
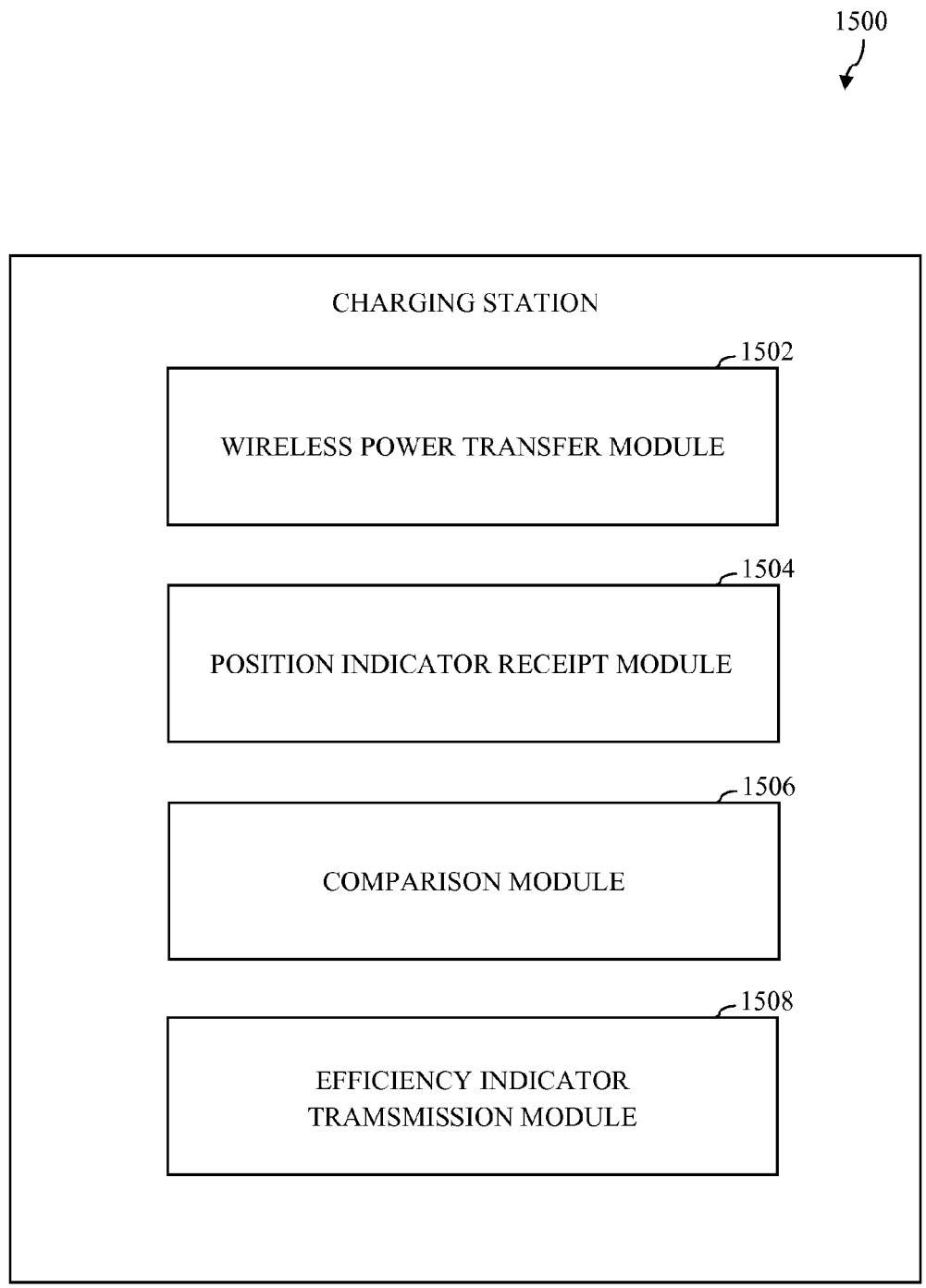

FIG. 15 is a block diagram of an example implementation of a charging station in accordance with an embodiment described herein.

Figure 16:
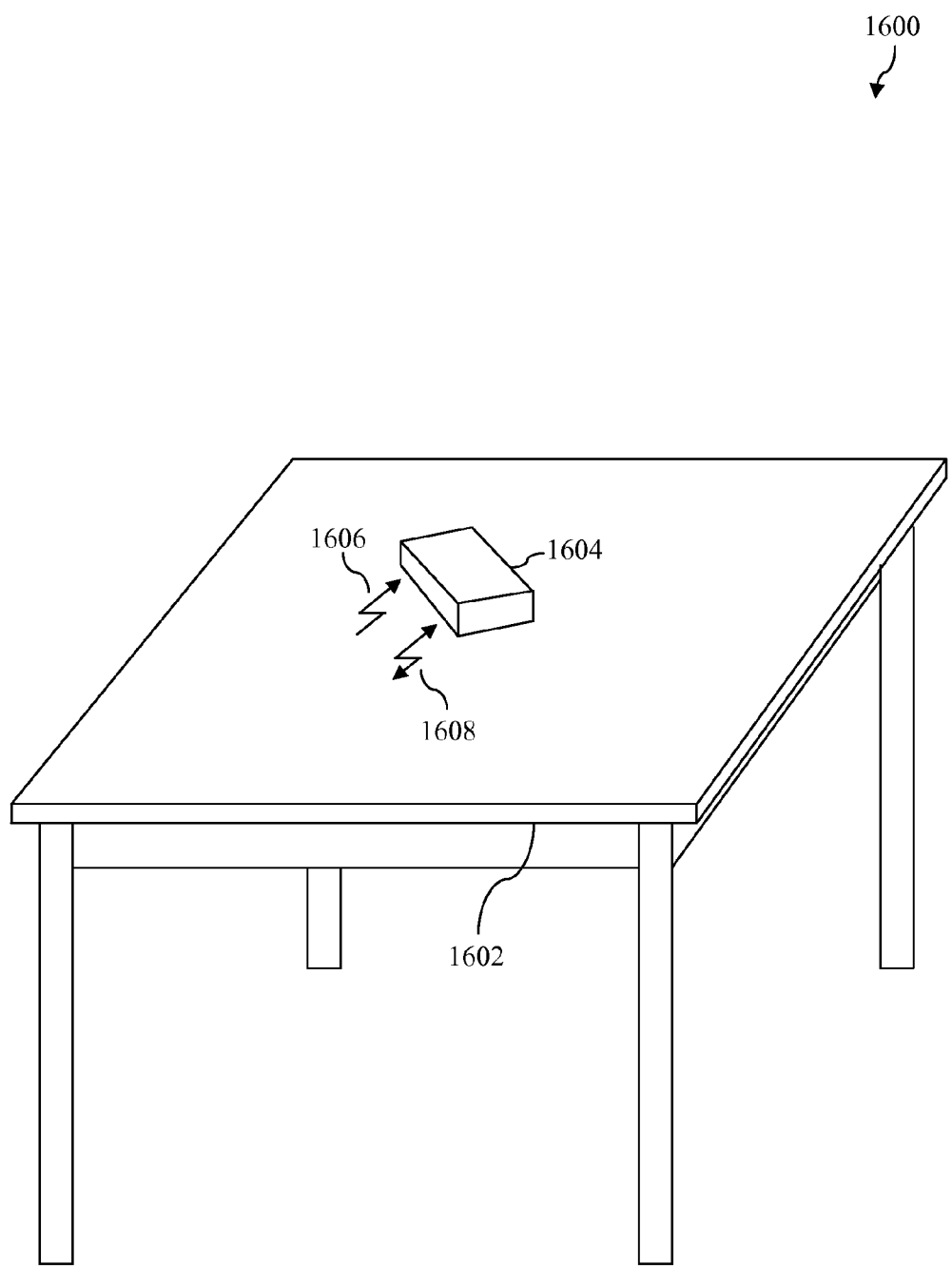
Figure 17:
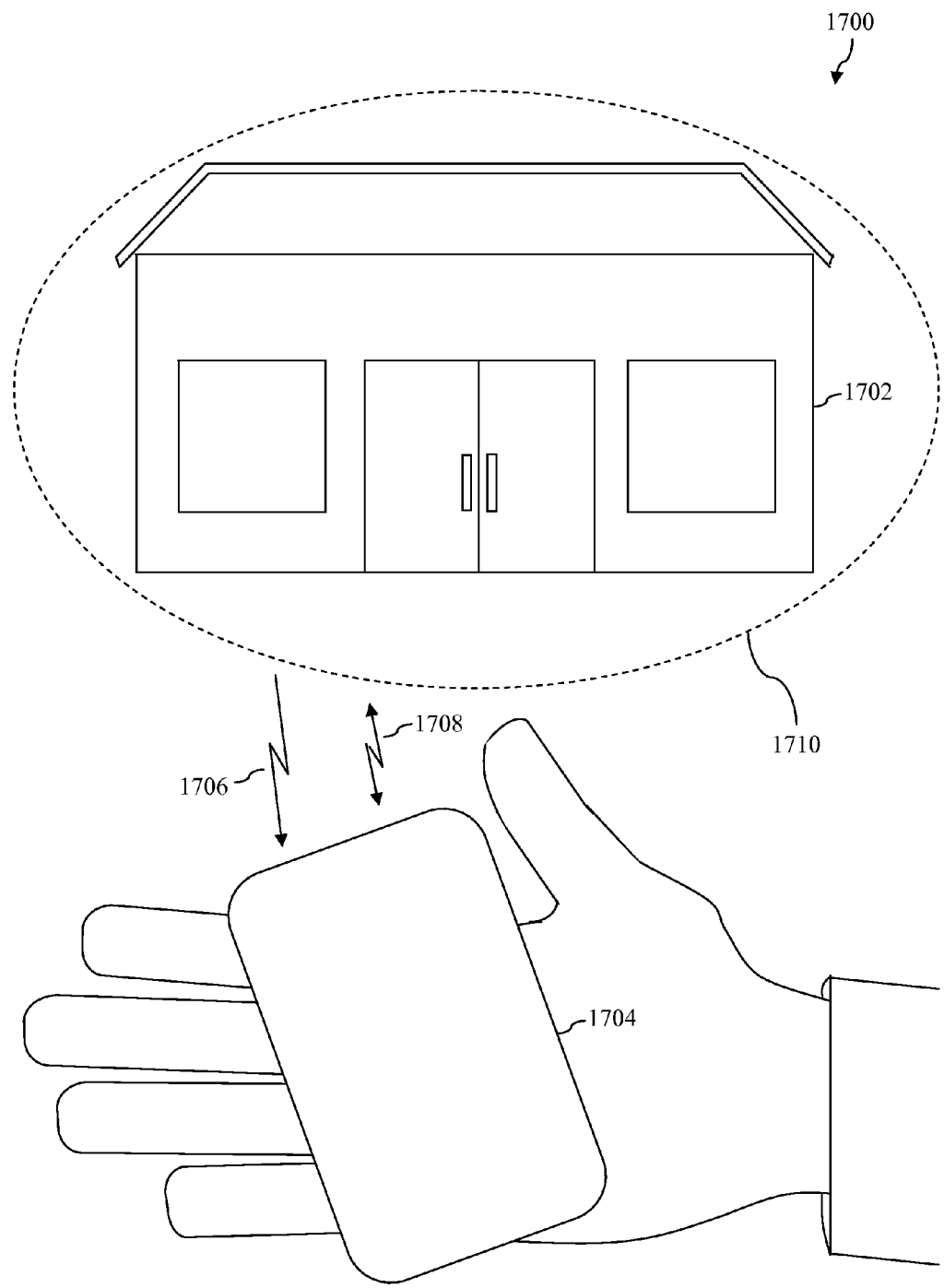

FIGS. 16 and 17 depict example environments in which an efficiency indicator may be used to increase efficiency of a wireless power transfer in accordance with embodiments described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, using an efficiency indicator for increasing efficiency of a wireless power transfer. The efficiency of a wireless power transfer is defined as the magnitude of power that is consumed by a portable electronic device with respect to the wireless power transfer divided by the magnitude of power that is provided to the portable electronic device with respect to the wireless power transfer. The efficiency of the wireless power transfer therefore indicates the proportion of the power that is wirelessly transferred to the portable electronic device that is consumed by the portable electronic device.

In accordance with some example embodiments, a charging station begins to wirelessly transfer power to a portable electronic device via a wireless power link. The portable electronic device sends a position indicator to the charging station via a wireless communication link once the charging station begins to wirelessly transfer the power to the portable electronic device. The position indicator specifies a position of the portable electronic device that corresponds to a first efficiency with respect to the wireless power transfer. A position is defined herein to mean an orientation and/or a location. Accordingly, a position of the portable electronic device refers to an orientation of the portable electronic device and/or a location of the portable electronic device.

Upon receiving the position indicator, the charging station sends an efficiency indicator to the portable electronic device that specifies a recommended position with respect to the portable electronic device. The recommended position corresponds to a second efficiency that is greater than the first efficiency with respect to the wireless power transfer. Upon receiving the efficiency indicator, the portable electronic device generates a sensory signal that indicates the recommended position with reference to the position of the portable electronic device.

A sensory signal is a signal that is perceptible by a human. For instance, the sensory signal may be an audio signal having a frequency in the audible spectrum (e.g., in a range between 20 hertz (Hz) and 20,000 kilohertz (kHz)), a visual signal having a frequency in the visible spectrum (e.g., in a range between 400 terahertz (THz) and 790 THz), a tactile signal, or any other signal that is human-perceptible. A tactile signal is a signal that a human is capable of perceiving using the sense of touch.

A method is described for using an efficiency indicator for increasing efficiency of a wireless power transfer. In accordance with this method, power is wirelessly received at a portable electronic device having a position from a charging station via a wireless power link. The position corresponds to a first efficiency with respect to receipt of the power. An efficiency indicator is received at the portable electronic device via a wireless communication link. The efficiency indicator specifies a recommended position of the portable electronic device that corresponds to a second efficiency that is greater than the first efficiency with respect to the receipt of the power. A sensory signal is generated that indicates the recommended position with reference to the position of the portable electronic device.

Another method is described for using an efficiency indicator for increasing efficiency of a wireless power transfer. In accordance with this method, a wireless power transfer is initiated from a charging station to a portable electronic device via a wireless power link. A position indicator is received from the portable electronic device at the charging station via a wireless communication link in response to initiation of the wireless power transfer. The position indicator specifies a position of the portable electronic device that corresponds to a first efficiency with respect to the wireless power transfer. An efficiency indicator is provided to the portable electronic device in response to receipt of the position indicator. The efficiency indicator specifies a recommended position of the portable electronic device that corresponds to a second efficiency that is greater than the first efficiency with respect to the wireless power transfer.

A system is described that includes a wireless power receipt module, an efficiency indicator receipt module, and a sensory signal module. The wireless power receipt module is configured to wirelessly receive power from a charging station via a wireless power link. The portable electronic device has a position that corresponds to a first efficiency with respect to receipt of the power. The efficiency indicator receipt module is configured to receive an efficiency indicator via a wireless communication link. The efficiency indicator specifies a recommended position of the portable electronic device that corresponds to a second efficiency that is greater than the first efficiency with respect to the receipt of the power. The sensory signal module is configured to generate a sensory signal that indicates the recommended position with reference to the position of the portable electronic device.

Another system is described that includes a wireless power transfer module, a position indicator receipt module, and an efficiency indicator transmission module. The wireless power transfer module is configured to initiate a wireless power transfer to a portable electronic device via a wireless power link. The position indicator receipt module is configured to receive a position indicator from the portable electronic device via a wireless communication link. The position indicator specifies a position of the portable electronic device that corresponds to a first efficiency with respect to the wireless power transfer. The efficiency indicator transmission module is configured to provide an efficiency indicator to the portable electronic device. The efficiency indicator specifies a recommended position of the portable electronic device that corresponds to a second efficiency that is greater than the first efficiency with respect to the wireless power transfer.

II. Example Wireless Power Transfer System in Accordance with an Embodiment

Figure 1:
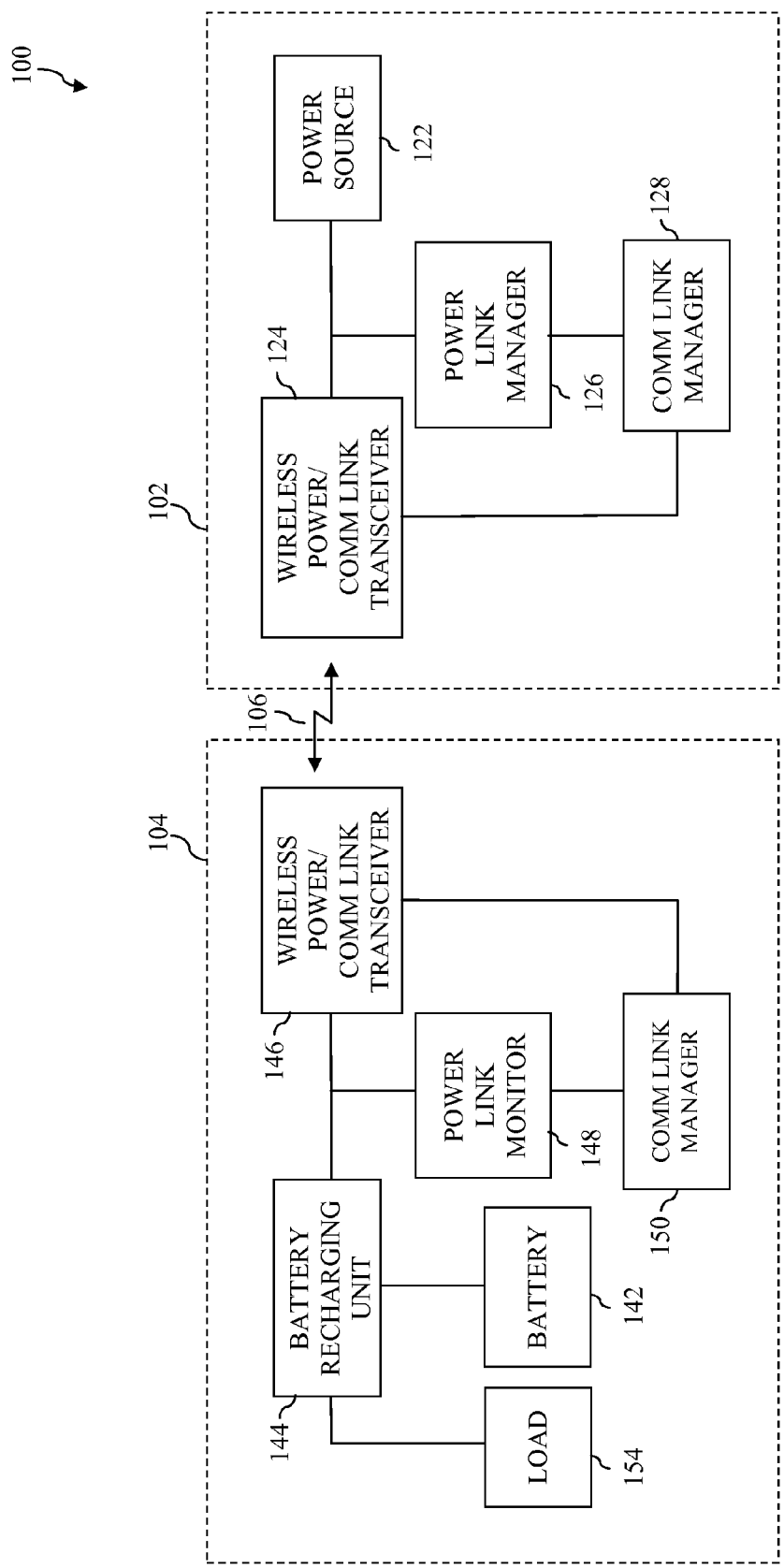
FIG. 1 is a block diagram of an example wireless power transfer system in accordance with an embodiment described herein.

FIG. 1 is a block diagram of an example wireless power transfer system 100 in accordance with an embodiment described herein. System 100 includes a charging station 102 and a portable electronic device 104. As will be described in more detail herein, charging station 102 is configured to wirelessly transfer power to portable electronic device 104 responsive to receipt of payment information therefrom. Charging station 102 is also configured to manage the wireless transfer of power to portable electronic device 104 based on certain parameters and/or state information received from portable electronic device 104.

As shown in FIG. 1, charging station 102 includes a power source 122 connected to a wireless power/communication link transceiver 124. Wireless power/communication link transceiver 124 is configured to wirelessly transfer power supplied by power source 122 to a wireless power/communication link transceiver 146 associated with portable electronic device 104 via an inductive link 106. As will be appreciated by persons skilled in the relevant art(s), such wireless power transfer may be carried out over inductive link 106 in accordance with the well-known principles of inductive coupling or resonant inductive coupling as discussed in the Background Section above. As will be further appreciated by persons skilled in the relevant art(s), the manner in which wireless power/communication link transceiver 124 and wireless power/communication link transceiver 146 are implemented will depend on the type of inductive coupling used. A variety of transceiver designs based on inductive coupling and resonant inductive coupling are available in the art and thus need not be described herein.

Charging station 102 also includes a power link manager 126 connected between power source 122 and wireless power/communication link transceiver 124. Power link manager 126 is configured to sense when wireless power/communication link transceiver 146 associated with portable electronic device 104 is inductively coupled to wireless power/communication link transceiver 124 and is thus capable of receiving power wirelessly therefrom. Power link manager 126 is further configured to transfer power wirelessly over inductive link 106 responsive to control signals from a communication link manager 128. Power link manager 126 may be further configured to monitor the amount of power that is wirelessly transferred via inductive link 106 to portable electronic device 104.

Communication link manager 128 is connected both to power link manager 126 and to wireless power/communication link transceiver 124. Communication link manager 128 is configured to establish and maintain a wireless communication link with portable electronic device 104 via wireless power/communication link transceiver 124 for the purpose of obtaining payment information and other information therefrom. Such other information may include, for example, device-specific parameters associated with portable electronic device 104 such as a maximum safe power that may be transferred to portable electronic device 104. Such other information may also include, for example, state information associated with portable electronic device 104 such an amount of power currently consumed or needed by portable electronic device 104.

Communication link manager 128 is thus configured to use inductive link 106 for the wireless communication of data. Depending upon the implementation, communication link manager 128 may be configured to carry out the wireless communication of data in accordance with any standard or proprietary induction-based data communication protocol. For example, communication link manager 128 may be configured to carry out the wireless communication of data in accordance with an NFC protocol as described in the Background Section above, although this example is not intended to be limiting and other standard or proprietary induction-based data communication protocols may be used.

Communication link manager 128 is further configured to transmit control signals to power link manager 126 to control whether and when power link manager 126 may transfer power wirelessly to portable electronic device 104. Communication link manager 128 can thus ensure that power is transferred to portable electronic device 104 only after requisite payment information has been received from portable electronic device 104. Communication link manager 128 can also control power link manager 126 to ensure that power is delivered to portable electronic device 104 in a manner that takes into account certain device-specific parameters such as a maximum safe power that may be transferred to portable electronic device 104 or state information such as an amount of power currently consumed or needed by portable electronic device 104.

Portable electronic device 104 within power transfer system 100 will now be described. As shown in FIG. 1, portable electronic device 104 includes a battery recharging unit 144 connected to wireless power/communication link transceiver 146. Wireless power/communication link transceiver 146 is configured to transfer wireless power received over inductive link 106 to battery recharging unit 144, which is configured to use such power to recharge a battery 142 connected thereto. Battery recharging unit 144 is also connected to a load 154 associated within portable electronic device 104, which can be powered by battery 142 in a well-known manner.

Portable electronic device 104 further includes a power link monitor 148 connected between wireless power/communication link transceiver 146 and battery recharging unit 144. Power link monitor 148 may be configured to monitor an amount of power that is wirelessly received via inductive link 106 and to provide this information to a communication link manager 150. Power link monitor 148 may provide other state information to communication link manager 150 including, for example, a current state of battery 142.

Communication link manager 150 is connected both to power link monitor 148 and to wireless power/communication link transceiver 146. Communication link manager 150 is configured to establish and maintain a wireless communication link with charging station 102 via wireless power/communication link transceiver 146 for the purpose of providing payment information and other information thereto. As noted above, such other information may include, for example, device-specific parameters associated with portable electronic device 104, such as a maximum safe power that may be transferred to portable electronic device 104, or state information associated with portable electronic device 104 such an amount of power currently consumed or needed by portable electronic device 104. This state information may be based on or derived from state information provided by power link monitor 148.

Communication link manager 150 is thus configured to use inductive link 106 for the wireless communication of data. Depending upon the implementation, communication link manager 150 may be configured to carry out the wireless communication of data in accordance with any standard or proprietary induction-based data communication protocol. For example, communication link manager 150 may be configured to carry out the wireless communication of data in accordance with an NFC protocol as described in the Background Section above, although this example is not intended to be limiting and other standard or proprietary induction-based data communication protocols may be used.

Figure 2:
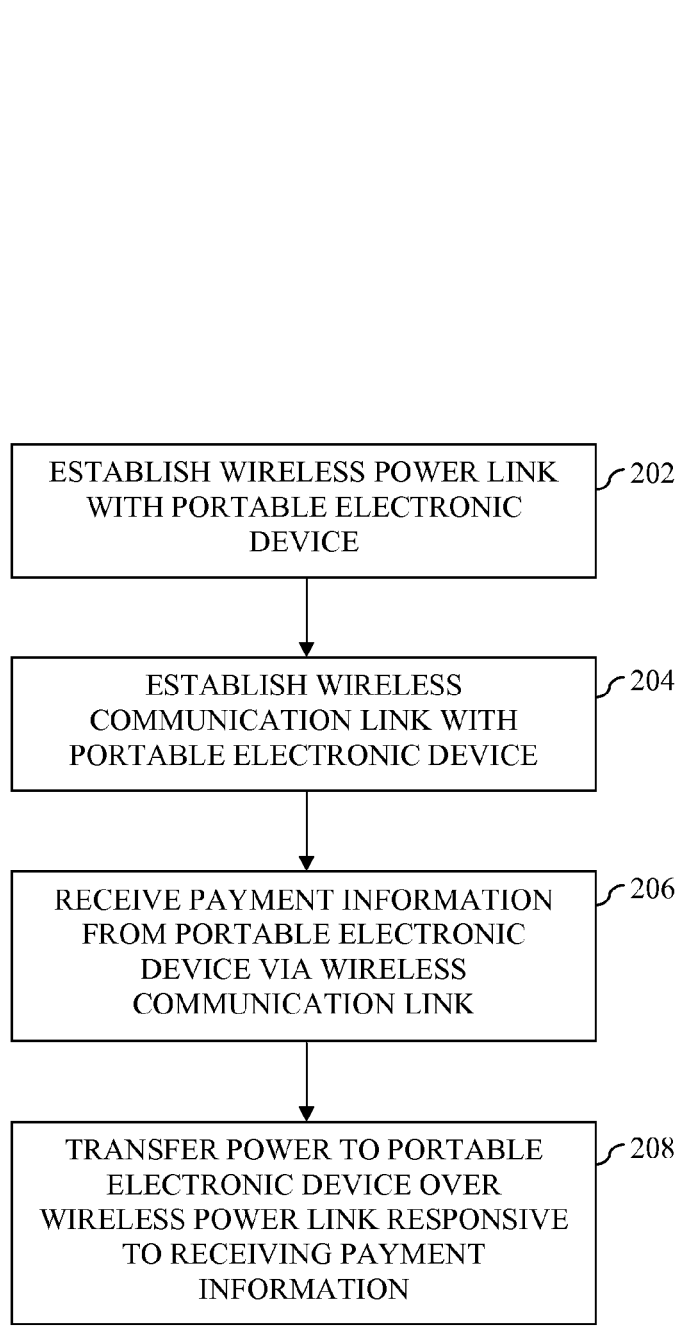
FIG. 2 depicts a flowchart of a method for wirelessly transferring power from a charging station to a portable electronic device in accordance with an embodiment described herein.

FIG. 2 depicts a flowchart 200 of a method for wirelessly transferring power from a charging station to a portable electronic device in accordance with an embodiment described herein. The method of flowchart 200 will now be described in reference to certain elements of example wireless transfer system 100 as described above in reference to FIG. 1. However, the method is not limited to that implementation.

As shown in FIG. 2, the method of flowchart 200 begins at step 202 in which power link manager 126 of charging station 102 establishes a wireless power link with portable electronic device 104. Power link manager 126 performs this function by allowing power to flow from power source 122 to wireless power/communication link transceiver 124, which has the effect of creating inductive link 106 between wireless power/communication link transceiver 124 of charging station 102 and wireless power/communication link transceiver 146 of portable electronic device 104. As discussed above, depending upon the implementation of wireless power/communication link transceiver 124 and wireless power/communication link transceiver 146, inductive link 106 may be created for example based on the principles of inductive coupling or resonant inductive coupling.

At step 204, communication link manager 128 of charging station 102 establishes a wireless communication link with portable electronic device 104. Communication link manager 128 performs this function by transmitting and/or receiving signals via wireless power/communication link transceiver 124 to/from wireless power/communication link transceiver 146 associated with portable electronic device 104. The wireless communication link is thus established via inductive link 106. As discussed above, the wireless communication link may be established in accordance with any standard or proprietary inductance-based data communication protocol.

At step 206, communication link manager 128 of charging station 102 receives payment information from portable electronic device 104 via the wireless communication link. As will be appreciated by persons skilled in the relevant art(s), the type of payment information that is received during step 206 may vary depending on the manner in which the wireless power transfer service is to be paid for by the user of portable electronic device 104.

For example, if the user will pay for the wireless power transfer through the subsequent billing of a credit card account, checking account, or some other account from which funds may be transferred, then the payment information may include a unique account identifier, such as an account number. Alternatively, if the charge to the user will be added to a list of additional charges due from the user (e.g., the charge is to be added to a hotel bill for the user), then the payment information may include a unique identifier of the user.

Furthermore, if the user has already paid for the wireless power transfer, then the payment information may include an electronic token indicating that such payment has occurred. Alternatively, if the user has purchased prepaid credits towards the wireless power transfer, then the payment information may include an electronic funds amount that is currently available to the user/owner for obtaining the service. The electronic funds amount may be stored on portable electronic device 104, or a card inserted or attached to portable electronic device 104.

The foregoing description of the types of payment information that may be received during step 206 are provided by way of example only and are not intended to limit the present invention. Persons skilled in the relevant art(s) will readily appreciate that other types of payment information may be received during step 206 other than or in addition to those types described above.

After the payment information has been received by communication link manager 128 during step 206, communication link manager 128 sends one or more control signals to power link manager 126 and, responsive to receiving the control signal(s), power link manager 126 allows power to be transferred to portable electronic device 104 over the wireless power link. This is generally shown at step 208.

In an embodiment, communication link manager 128 validates and/or processes the payment information prior to sending the control signal(s) to power link manager 126. In another embodiment, communication link manager 128 transmits the payment information to an external entity for validation and/or processing prior to sending the control signal(s) to power link manager 126. For example, communication link manager 128 may provide the payment information to a network interface within charging station 102 (not shown in FIG. 1) for wired or wireless communication to a network entity, such as a server, for processing and/or validation.

In a further implementation of the foregoing method, power link manager 126 monitors or meters the amount of power wirelessly transferred to portable electronic device 104 via the wireless power link. The monitored amount can then be used to charge the user of portable electronic device 104 based on the amount of power transferred. In one embodiment, the monitored amount is transmitted to an external entity so that the user of portable electronic device 104 may be charged based on the monitored amount. The external entity may be, for example, a remote network entity, such as a server, or may be portable electronic device 104.

In the foregoing method of flowchart 200, the establishment of the wireless power link in step 202 may occur before, contemporaneously with, or after the establishment of the wireless communication link in step 204 depending upon the implementation. Furthermore, the establishment of the wireless power link may occur responsive to the establishment of the wireless communication link or vice versa. With respect to the establishment of the wireless communication link, either charging station 102 or portable electronic device 104 may act as the initiator depending upon the implementation.

Figure 3:
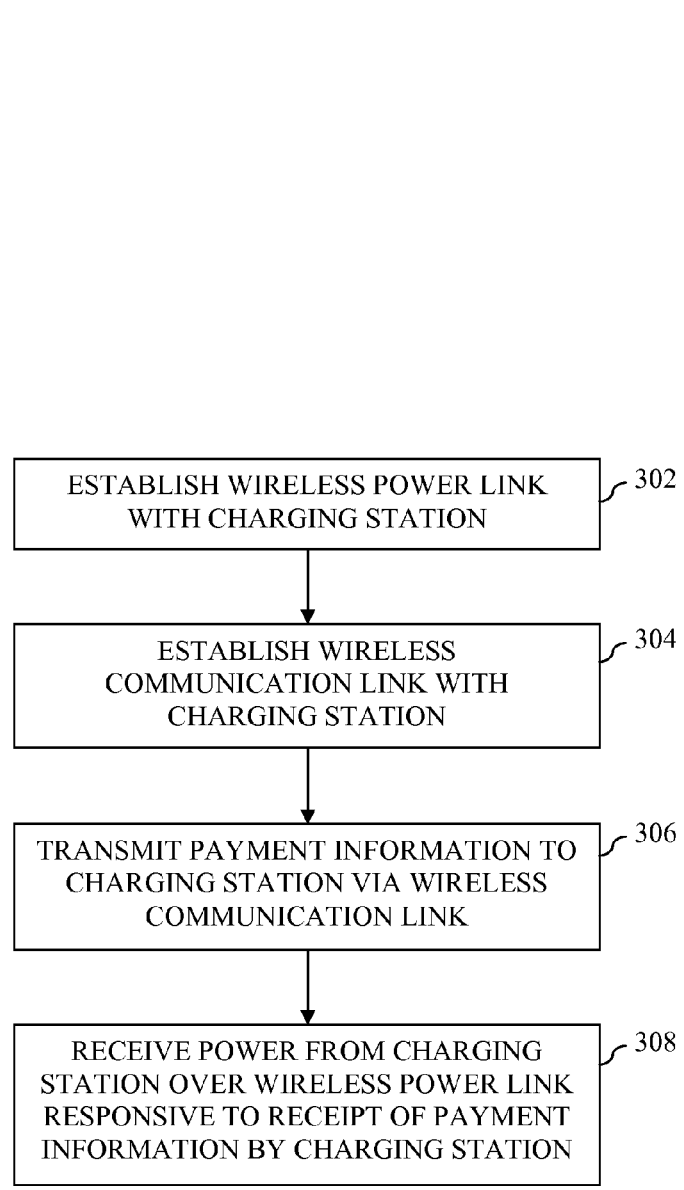
FIG. 3 depicts a flowchart of a method for wirelessly receiving power from a charging station by a portable electronic device in accordance with an embodiment described herein.

FIG. 3 depicts a flowchart 300 of a method for wirelessly receiving power from a charging station by a portable electronic device in accordance with an embodiment described herein. In contrast to the steps of flowchart 200, which are performed by a charging station, the steps of flowchart 300 are performed by a portable electronic device that is configured to interact with a charging station. Thus, the method of flowchart 300 may be thought of as a counterpart method to the method of flowchart 200.

The method of flowchart 300 will now be described in reference to certain elements of example wireless transfer system 100 as described above in reference to FIG. 1. However, the method is not limited to that implementation.

As shown in FIG. 3, the method of flowchart 300 begins at step 302 in which a wireless power link is established between wireless power/communication link transceiver 146 of portable electronic device 104 and wireless power/communication link transceiver 124 of charging station 102. The manner in which such a wireless power link is established was discussed above in reference to step 202 of flowchart 200.

At step 304, communication link manager 150 of portable electronic device 104 establishes a wireless communication link with charging station 102. Communication link manager 150 performs this function by transmitting and/or receiving signals via wireless power/communication link transceiver 146 to/from wireless power/communication link transceiver 124 associated with charging station 102. The wireless communication link is thus established via inductive link 106. As discussed above, the wireless communication link may be established in accordance with any standard or proprietary inductance-based data communication protocol.

At step 306, communication link manager 150 of portable electronic device 104 transmits payment information to charging station 102 via the wireless communication link. As will be appreciated by persons skilled in the relevant art(s), the type of payment information that is transmitted during step 306 may vary depending on the manner in which the wireless power transfer service is to be paid for by the user of portable electronic device 104. Examples of various types of payment information were described above in reference to step 206 of flowchart 200.

Responsive to the receipt of the payment information by charging station 102, charging station 102 transfers power to portable electronic device 104 over the wireless power link. The transferred power is received by wireless power/communication link transceiver 146 and applied to battery recharging unit 144. This is generally shown at step 308.

In the foregoing method of flowchart 300, the establishment of the wireless power link in step 302 may occur before, contemporaneously with, or after the establishment of the wireless communication link in step 304 depending upon the implementation. Furthermore, the establishment of the wireless power link may occur responsive to the establishment of the wireless communication link or vice versa. With respect to the establishment of the wireless communication link, either charging station 102 or portable electronic device 104 may act as the initiator depending upon the implementation.

Figure 4:
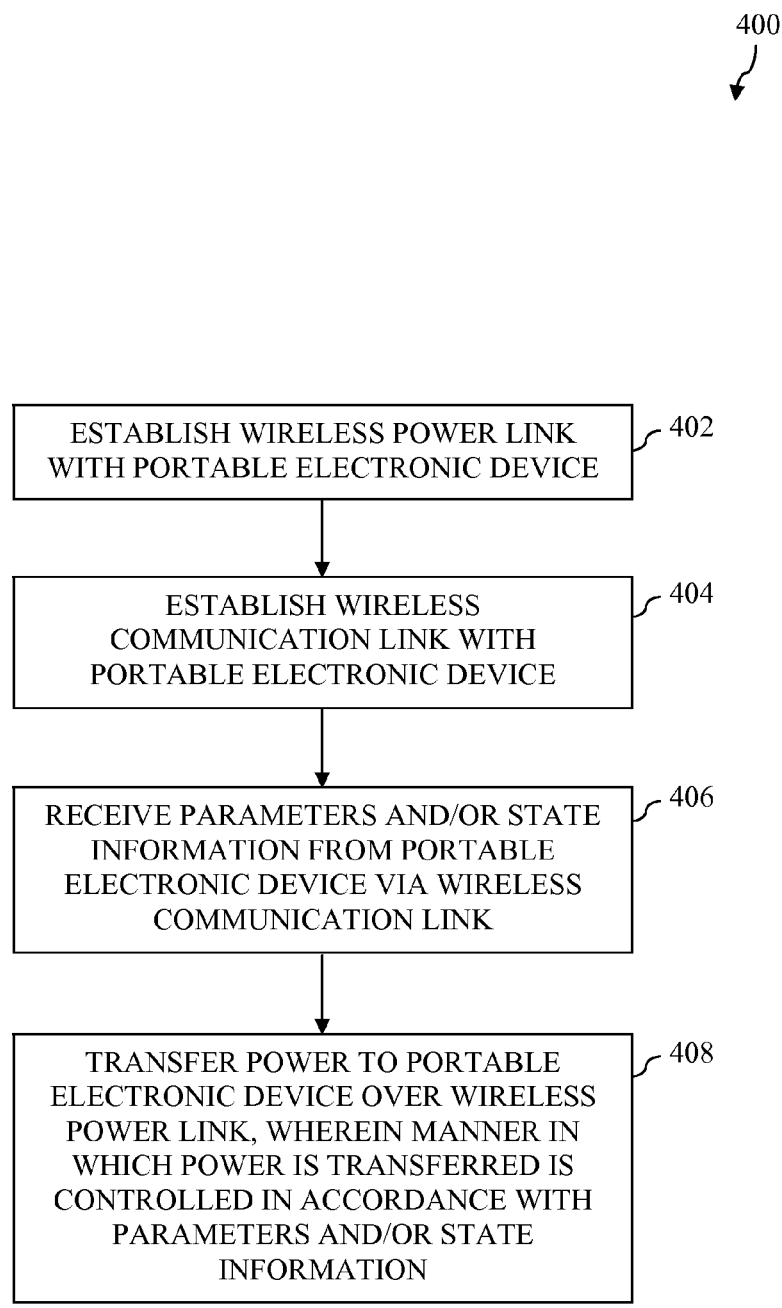
FIG. 4 depicts a flowchart of an additional method for wirelessly transferring power from a charging station to a portable electronic device in accordance with an embodiment described herein.

FIG. 4 depicts a flowchart 400 of an additional method for wirelessly transferring power from a charging station to a portable electronic device in accordance with an embodiment described herein. The method of flowchart 400 will now be described in reference to certain elements of example wireless transfer system 100 as described above in reference to FIG. 1. However, the method is not limited to that implementation.

As shown in FIG. 4, the method of flowchart 400 begins at step 402 in which power link manager 126 of charging station 102 establishes a wireless power link with portable electronic device 104. Power link manager 126 performs this function by allowing power to flow from power source 122 to wireless power/communication link transceiver 124, which has the effect of creating inductive link 106 between wireless power/communication link transceiver 124 of charging station 102 and wireless power/communication link transceiver 146 of portable electronic device 104. As discussed above, depending upon the implementation of wireless power/communication link transceiver 124 and wireless power/communication link transceiver 146, inductive link 106 may be created based on the principles of inductive coupling or resonant inductive coupling for example.

At step 404, communication link manager 128 of charging station 102 establishes a wireless communication link with portable electronic device 104. Communication link manager 128 performs this function by transmitting and/or receiving signals via wireless power/communication link transceiver 124 to/from wireless power/communication link transceiver 146 associated with portable electronic device 104. The wireless communication link is thus established via inductive link 106. As discussed above, the wireless communication link may be established in accordance with any standard or proprietary inductance-based data communication protocol.

At step 406, communication link manager 128 of charging station 102 receives parameters and/or state information from portable electronic device 104 via the wireless communication link. The parameters may include, for example, a maximum safe power that may be transmitted to portable electronic device 104. The state information may include, for example, an amount of power currently consumed or needed by portable electronic device 104.

After receiving the parameters and/or state information, communication link manager 128 sends one or more control signals to power link manager 126 and, responsive to receiving the control signal(s), power link manager 128 transfers power to portable electronic device 104 over the wireless power link in a manner that takes into account the received parameters and/or state information. This is generally shown at step 408.

In one embodiment, controlling the power transfer in accordance with received parameters includes controlling the wireless power link to ensure that the amount of power transferred over the link does not exceed a maximum safe power that may be transmitted to portable electronic device 104. In another embodiment, controlling the power transfer in accordance with received state information includes controlling the wireless power link to ensure that the amount of power that is transferred over the link is sufficient to recharge portable electronic device 104 or does not exceed an amount of power that is sufficient to recharge portable electronic device 104.

In the foregoing method of flowchart 400, the establishment of the wireless power link in step 402 may occur before, contemporaneously with, or after the establishment of the wireless communication link in step 404 depending upon the implementation. Furthermore, the establishment of the wireless power link may occur responsive to the establishment of the wireless communication link or vice versa. With respect to the establishment of the wireless communication link, either charging station 102 or portable electronic device 104 may act as the initiator depending upon the implementation.

Figure 5:
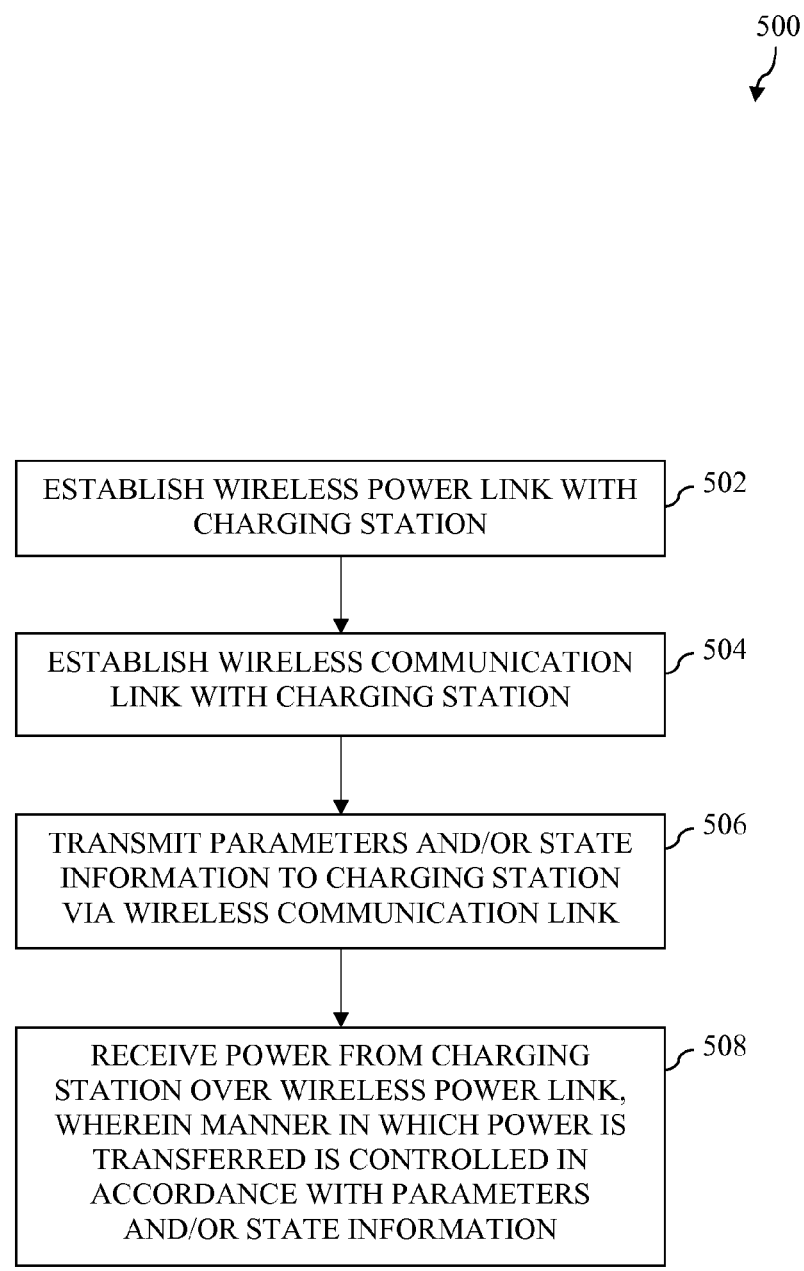
FIG. 5 depicts a flowchart of an additional method for wirelessly receiving power from a charging station by a portable electronic device in accordance with an embodiment described herein.

FIG. 5 depicts a flowchart 500 of a method for wirelessly receiving power from a charging station by a portable electronic device in accordance with an embodiment described herein. In contrast to the steps of flowchart 400, which are performed by a charging station, the steps of flowchart 500 are performed by a portable electronic device that is configured to interact with a charging station. Thus, the method of flowchart 500 may be thought of as a counterpart method to the method of flowchart 400.

The method of flowchart 500 will now be described in reference to certain elements of example wireless transfer system 100 as described above in reference to FIG. 1. However, the method is not limited to that implementation.

As shown in FIG. 5, the method of flowchart 500 begins at step 502 in which a wireless power link is established between wireless power/communication link transceiver 146 of portable electronic device 104 and wireless power/communication link transceiver 124 of charging station 102. The manner in which such a wireless power link is established was discussed above in reference to step 402 of flowchart 400.

At step 504, communication link manager 150 of portable electronic device 104 establishes a wireless communication link with charging station 102. Communication link manager 150 performs this function by transmitting and/or receiving signals via wireless power/communication link transceiver 146 to/from wireless power/communication link transceiver 124 associated with charging station 102. The wireless communication link is thus established via inductive link 106. As discussed above, the wireless communication link may be established in accordance with any standard or proprietary inductance-based data communication protocol.

At step 506, communication link manager 150 of portable electronic device 104 transmits parameters and/or state information to charging station 102 via the wireless communication link. As noted above, the parameters may include, for example, a maximum safe power that may be transmitted to portable electronic device 104 and the state information may include, for example, an amount of power currently consumed or needed by portable electronic device 104.

In an embodiment, communication link manager 150 generates or derives the state information from information collected by power link monitor 148. For example, power link monitor 148 may monitor the wireless power link to determine an amount of power transferred over the link. This amount of power may then be reported as state information to charging station 102 over the wireless communication link. Additionally, power link monitor 148 may provide other state information to communication link manager 150 including, for example, a current state of battery 142.

Responsive to the receipt of the parameters and/or state information by charging station 102, charging station 102 transfers power to portable electronic device 104 over the wireless power link, wherein the manner in which power is transferred is controlled in accordance with the parameters and/or state information. The transferred power is received by wireless power/communication link transceiver 146 and applied to battery recharging unit 144. This is generally shown at step 508.

In the foregoing method of flowchart 500, the establishment of the wireless power link in step 502 may occur before, contemporaneously with, or after the establishment of the wireless communication link in step 504 depending upon the implementation. Furthermore, the establishment of the wireless power link may occur responsive to the establishment of the wireless communication link or vice versa. With respect to the establishment of the wireless communication link, either charging station 102 or portable electronic device 104 may act as the initiator depending upon the implementation.

III. Alternative Wireless Power Transfer System Implementations

Alternative implementations of wireless power transfer system 100 will now be described. Each of the alternative implementations is also capable of wirelessly transferring/receiving power in accordance with the methods of flowcharts 200, 300, 400 and 500 as described above in reference to FIG. 2, FIG. 3, FIG. 4 and FIG. 5, respectively.

Figure 6:
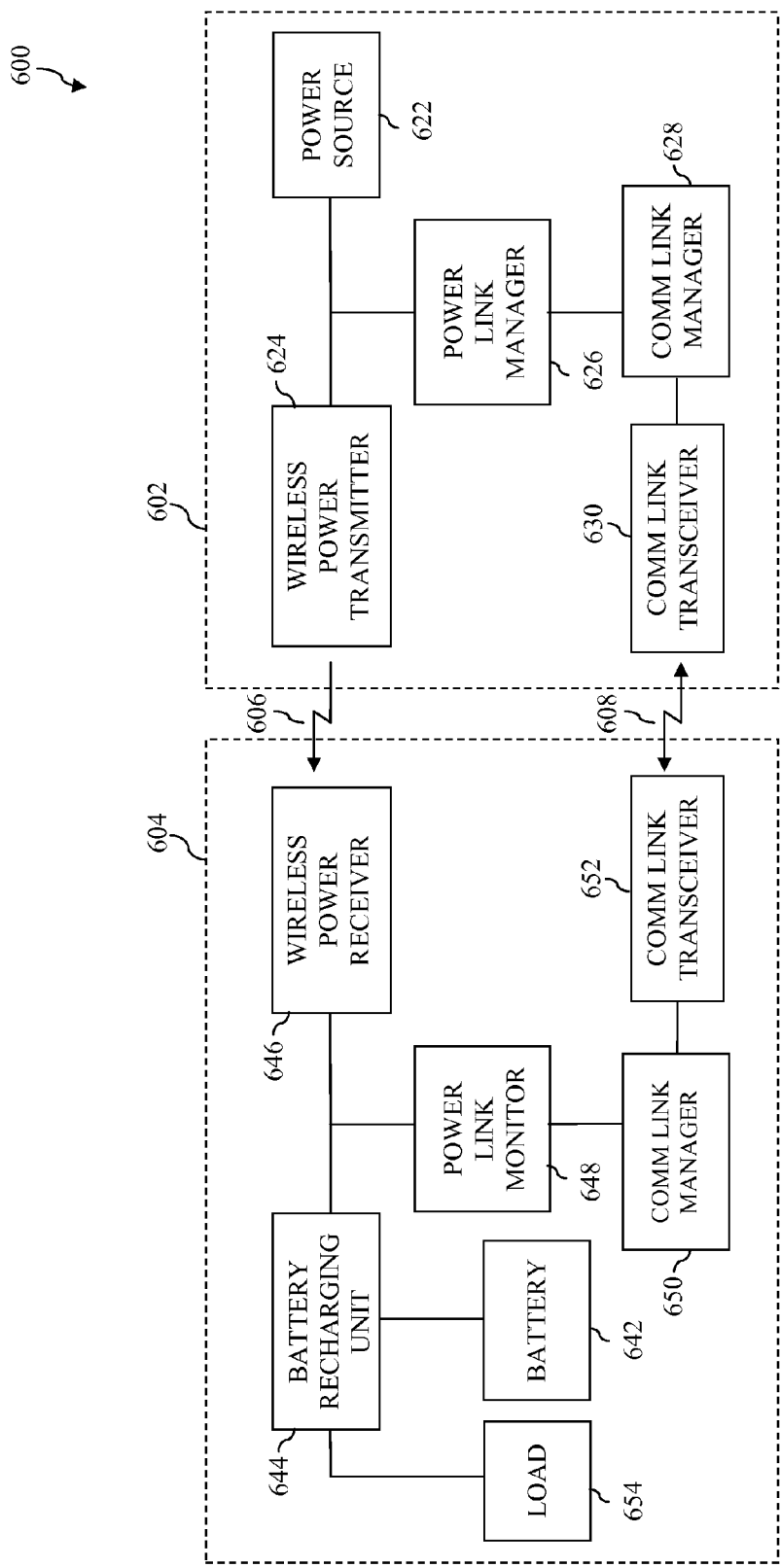
FIG. 6 is a block diagram of a wireless power transfer system in accordance with an embodiment described herein in which a wireless power link is established using a receiver and transmitter and a wireless communication link is established using a separate pair of transceivers.

For example, FIG. 6 is a block diagram of a wireless power transfer system 600 that includes similar elements to those described in reference to FIG. 1 except that the wireless power link between the charging station and the portable electronic device is implemented using a wireless power transmitter and receiver while the wireless communication link between the charging station and the portable electronic device is implemented using a separate pair of communication link transceivers.

As shown in FIG. 6, wireless power transfer system 600 includes a charging station 602 and a portable electronic device 604. Charging station 602 includes a power source 622, a wireless power transmitter 624, a power link manager 626, a communication link manager 628, and a communication link transceiver 630. Portable electronic device 604 includes a battery 642, a battery recharging unit 644, a wireless power receiver 646, a power link monitor 648, a communication link manager 650, a communication link transceiver 652, and a load 654. With the exception of certain elements discussed below, the elements of charging station 602 are configured to function in a similar manner to like-named elements of charging station 102 of FIG. 1. Likewise, with the exception of certain elements discussed below, the elements of portable electronic device 604 are configured to function in a similar manner to like-named elements of portable electronic device 104 of FIG. 1.

Wireless power transmitter 624 is configured to operate under the control of power link manager 626 to wirelessly transfer power supplied by power source 622 to wireless power receiver 646 associated with portable electronic device 604 via an inductive link 606. The wireless power transfer may be carried out over inductive link 606 in accordance with the well-known principles of inductive coupling or resonant inductive coupling as discussed in the Background Section above. The manner in which wireless power transmitter 624 and wireless power receiver 646 are implemented will depend on the type of inductive coupling used. A variety of transmitter and receiver designs based on inductive coupling and resonant inductive coupling are available in the art and thus need not be described herein.

In the embodiment shown in FIG. 6, communication link transceivers 630 and 652 are used to establish and maintain a wireless communication link 608 between charging station 602 and portable electronic device 604 that is separate from inductive link 606. Wireless communication link 608 is established for the purpose of transferring payment information and/or device-specific parameters or state information from portable electronic device 604 to charging station 602. Charging station 602 may then use such information in a like manner to that described above with respect to charging station 102 of FIG. 1.

As will be appreciated by persons skilled in the relevant art(s), the manner in which communication link transceivers 630 and 652 are implemented will depend on the type of wireless communication link to be established therebetween. In accordance with one embodiment, wireless communication link 608 may be established using NFC technology as described above in the Background Section. Alternatively, wireless communication link 608 may be established in accordance with certain RF-based short-range communication technologies such as Bluetooth™, as described in the various standards developed and licensed by the Bluetooth™ Special Interest Group, or technologies such as ZigBee® that are based on the IEEE 802.15.4 standard for wireless personal area networks (specifications describing ZigBee are publically available from the ZigBee® Alliance). Still further, wireless communication link 608 may be established in accordance with other RF-based communication technologies such as any of the well-known IEEE 802.11 protocols. However, these examples are not intended to be limiting, and wireless communication link 608 between charging station 602 and portable electronic device 604 may be established using a variety of other standard or propriety communication protocols.

Figure 7:
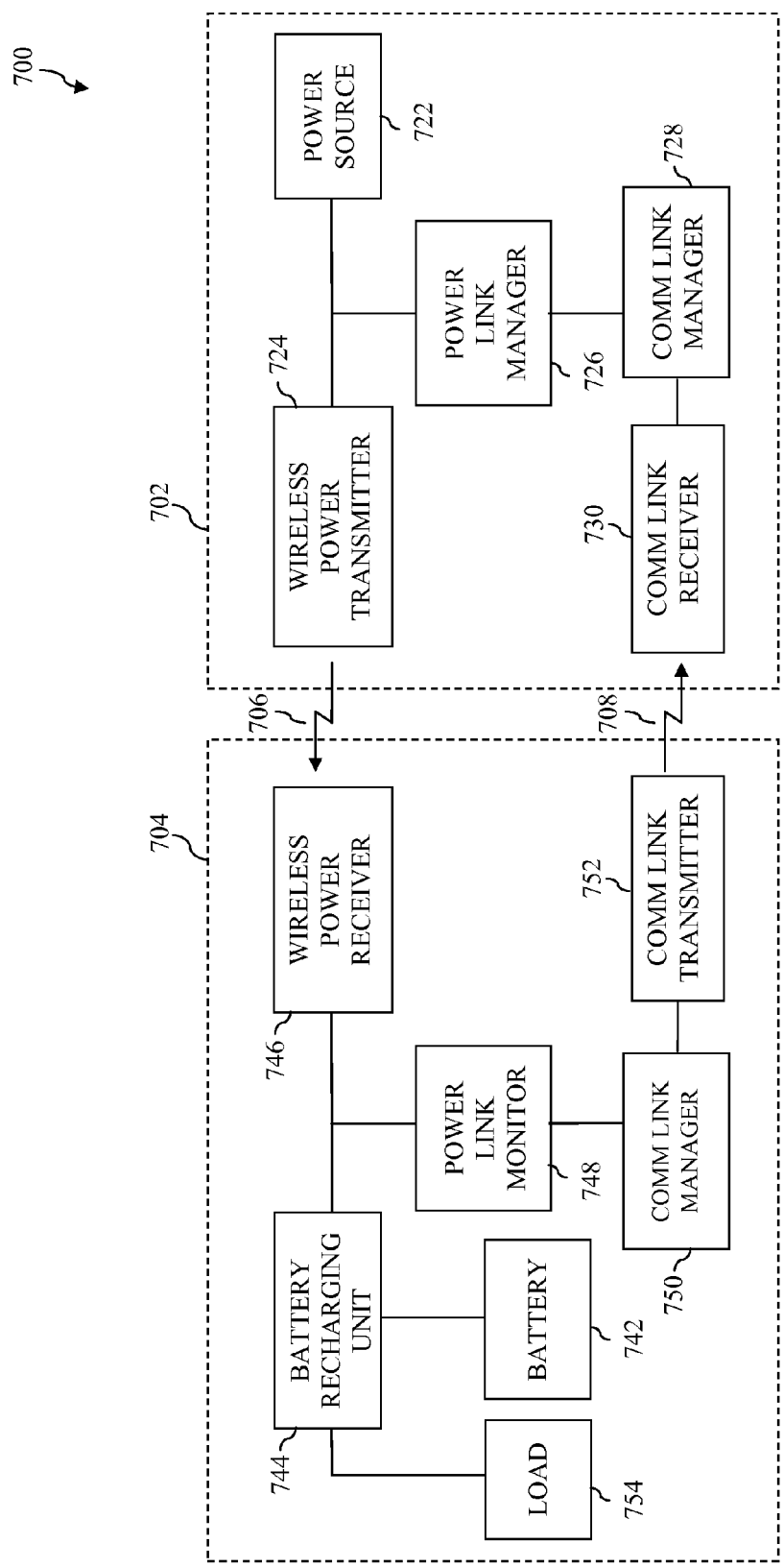
FIG. 7 is a block diagram of a wireless power transfer system in accordance with an alternate embodiment described herein in which a wireless communication link between a portable electronic device and a charging station is unidirectional.

FIG. 7 is a block diagram of a wireless power transfer system 700 that includes similar elements to those described in reference to FIG. 6 except that the wireless communication link between the portable electronic device and the charging station is unidirectional rather than bidirectional.

As shown in FIG. 7, wireless power transfer system 700 includes a charging station 702 and a portable electronic device 704. Charging station 702 includes a power source 722, a wireless power transmitter 724, a power link manager 726, a communication link manager 728, and a communication link receiver 730. Portable electronic device 704 includes a battery 742, a battery recharging unit 744, a wireless power receiver 746, a power link monitor 748, a communication link manager 750, a communication link transmitter 752, and a load 754. With the exception of certain elements discussed below, the elements of charging station 702 are configured to function in a similar manner to like-named elements of charging station 602 of FIG. 6. Likewise, with the exception of certain elements discussed below, the elements of portable electronic device 704 are configured to function in a similar manner to like-named elements of portable electronic device 604 of FIG. 6.

Communication link manager 750 within portable electronic device 704 is configured to establish a unidirectional wireless communication link 708 with charging station 702 by transmitting signals via communication link transmitter 752 to communication link receiver 730. This unidirectional wireless communication link may then be used to transmit payment information and/or device-specific parameters or state information from portable electronic device 704 to charging station 702. Charging station 702 may then use such information in a like manner to that described above with respect to charging station 102 of FIG. 1.

Figure 8:
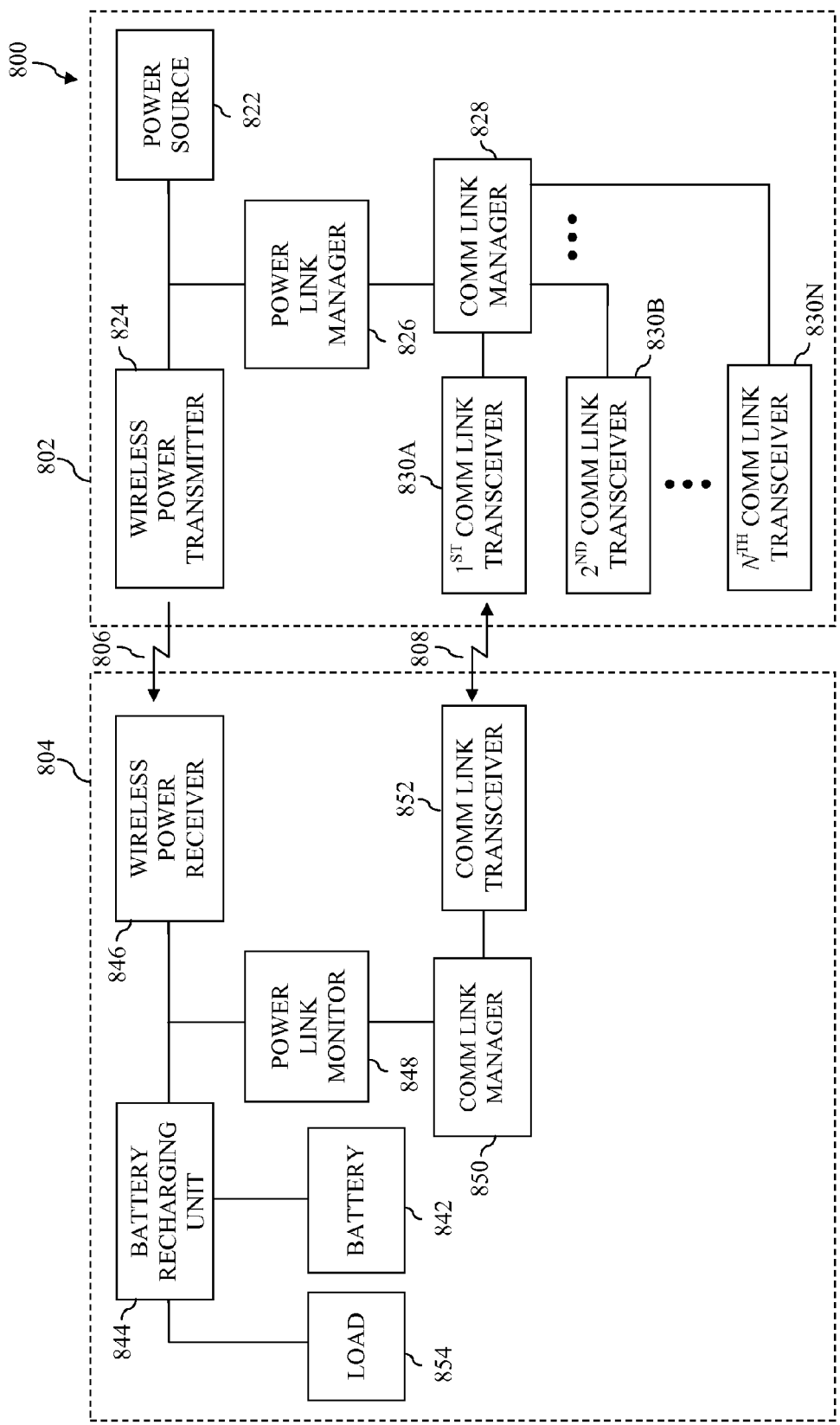
FIG. 8 is a block diagram of a wireless power transfer system in accordance with an alternate embodiment described herein in which a charging station includes a plurality of different communication link transceivers to facilitate the establishment of wireless communication links with a plurality of different types of portable electronic devices.

FIG. 8 is a block diagram of a wireless power transfer system 800 that includes similar elements to those described in reference to FIG. 6 except that the charging station includes a plurality of different communication link transceivers to facilitate the establishment of wireless communication links with a plurality of different types of portable electronic devices.

As shown in FIG. 8, wireless power transfer system 800 includes a charging station 802 and a portable electronic device 804. Charging station 802 includes a power source 822, a wireless power transmitter 824, a power link manager 826, a communication link manager 828, and a plurality of communication link transceivers 830A-830N. Portable electronic device 804 includes a battery 842, a battery recharging unit 844, a wireless power receiver 846, a power link monitor 848, a communication link manager 850, a communication link transceiver 852, and a load 854. With the exception of certain elements discussed below, the elements of charging station 802 are configured to function in a similar manner to like-named elements of charging station 602 of FIG. 6. Likewise, with the exception of certain elements discussed below, the elements of portable electronic device 804 are configured to function in a similar manner to like-named elements of portable electronic device 604 of FIG. 6.

Each of the communication link transceivers 830A-830N is configured for wireless communication in accordance with a different wireless protocol. For example, first communication link transceiver 830A may be configured for communication in accordance with NFC, second communication link transceiver 830B may be configured for communication in accordance with Bluetooth™, and Nth communication link transceiver 830N may be configured for communication in accordance with one of the IEEE 802.11 standards. This advantageously enables charging station 802 to receive payment information and device-specific parameters and/or state information from a plurality of different device types to facilitate the wireless transfer of power to such devices.

IV. Example Embodiments for Using an Efficiency Indicator for Increasing Efficiency of a Wireless Power Transfer Some example embodiments are capable of using an efficiency indicator for increasing efficiency of a wireless power transfer. The efficiency of a wireless power transfer is defined as the magnitude of power that is consumed by a portable electronic device with respect to the wireless power transfer divided by the magnitude of power that is provided to the portable electronic device with respect to the wireless power transfer. The efficiency of the wireless power transfer therefore indicates the proportion of the power that is wirelessly transferred to the portable electronic device that is consumed by the portable electronic device.

In accordance with some example embodiments, a charging station (e.g., charging station 102, 602, 702, or 802) begins to wirelessly transfer power to a portable electronic device (e.g., portable electronic device 104, 604, 704, or 804) via a wireless power link (e.g., link 106, 606, 706, or 806). The portable electronic device sends a position indicator to the charging station via a wireless communication link (e.g., link 106, 608, 708, or 808) once the charging station begins to wirelessly transfer the power to the portable electronic device. The position indicator specifies a position of the portable electronic device that corresponds to a first efficiency with respect to the wireless power transfer. A position is defined herein to mean an orientation and/or a location. Accordingly, a position of the portable electronic device refers to an orientation of the portable electronic device and/or a location of the portable electronic device.

Upon receiving the position indicator, the charging station sends an efficiency indicator to the portable electronic device that specifies a recommended position with respect to the portable electronic device. The recommended position corresponds to a second efficiency that is greater than the first efficiency with respect to the wireless power transfer. Upon receiving the efficiency indicator, the portable electronic device generates a sensory signal that indicates the recommended position with reference to the position of the portable electronic device.

A sensory signal is a signal that is perceptible by a human. For instance, the sensory signal may be an audio signal having a frequency in the audible spectrum (e.g., in a range between 20 hertz (Hz) and 20,000 kilohertz (kHz)), a visual signal having a frequency in the visible spectrum (e.g., in a range between 400 terahertz (THz) and 790 THz), a tactile signal, or any other signal that is human-perceptible. A tactile signal is a signal that a human is capable of perceiving using the sense of touch.

FIG. 9 depicts a flowchart 900 of a method for using an efficiency indicator for increasing efficiency of a wireless power transfer in accordance with an embodiment described herein. Flowchart 900 may be performed by portable electronic device 104, 604, 704, or 804 of respective wireless power transfer system 100, 600, 700, or 800 shown in respective FIG. 1, 6, 7, or 8, for example. For illustrative purposes, flowchart 900 is described with respect to a portable electronic device 1000 shown in FIG. 10, which is an example of a portable electronic device 104, 604, 704, or 804, according to an embodiment.

As shown in FIG. 10, portable electronic device 1000 includes a wireless power receipt module 1002, an efficiency indicator receipt module 1004, and a sensory signal module 1006. Sensory signal module includes control logic 1008, display 1010, and a plurality of lights 1012A-1012H. Further structural and operational embodiments will be apparent to persons skilled in the relevant art(s) based on the discussion regarding flowchart 900. Flowchart 900 is described as follows.

As shown in FIG. 9, the method of flowchart 900 begins at step 902. In step 902, power is wirelessly received at a portable electronic device from a charging station via a wireless power link. The portable electronic device has a position, which corresponds to a first efficiency with respect to receipt of the power. The power may be wirelessly received in accordance with an inductive coupling technique, a resonant inductive coupling technique, or any other suitable technique. In an example implementation, wireless power receipt module 1002 wirelessly receives the power via the wireless power link.

At step 904, an efficiency indicator is received at the portable electronic device via a wireless communication link. The efficiency indicator specifies a recommended position of the portable electronic device that corresponds to a second efficiency that is greater than the first efficiency with respect to the receipt of the power.

For instance, the efficiency indicator may be received via the wireless communication link in accordance with a Near Field Communication (NFC) protocol, a Bluetooth™ protocol, a ZigBee® protocol, an IEEE 802.11 protocol, or any other suitable protocol. The wireless power link and the wireless communication link may be implemented as separate links or as a common link. The wireless power link and the wireless communication link may be inductive links, though the scope of the example embodiments is not limited in this respect. In an example implementation, efficiency indicator receipt module 1004 receives the efficiency indicator.

At step 906, a sensory signal is generated that indicates the recommended position with reference to the position of the portable electronic device. In an example implementation, sensory signal module 1006 generates the sensory signal.

The sensory signal may be generated using any of a variety of techniques. For instance, the sensory signal may be generated using a speaker, a display, light(s), a vibrating mechanism, any other suitable element that is capable of generating the sensory signal, or a combination thereof in accordance with commands provided by control logic 1008. As shown in FIG. 10, portable electronic device 1000 includes a plurality of lights 1012A-1012H. One or more of the lights 1012A-1012H may be illuminated to indicate the recommended position with reference to the position of portable electronic device 1000. For instance, control logic 1008 may provide instructions for illuminating one or more of the lights 1012A-1012H. Portable electronic device is shown in FIG. 10 to include eight lights 1012A-1012H for illustrative purposes and is not intended to be limiting. It will be recognized that portable electronic device 100 may include any number of lights or no lights.

In accordance with an example embodiment, a number of the lights 1012A-1012H is illuminated, such that the number corresponds to a magnitude of difference between the position of portable electronic device 1000 and the recommended position. As shown in FIG. 10, one light (i.e., light 1012A) is illuminated for illustrative purposes and is not intended to be limiting. Any number of the lights 1012A-1012H may be illuminated.

In accordance with another example embodiment, one or more of the lights 1012A-1012H are illuminated to provide illumination having an intensity that corresponds to a magnitude of difference between the position of portable electronic device 1000 and the recommended position. For example, the intensity of illumination that is provided by each of the lights 1012A-1012H may be adjustable within a range of intensities to enable adjustment of the cumulative intensity of illumination that is provided by the plurality of lights 1012A-1012H. In another example, one or more of the lights 1012A-1012H may be selectively turned on and/or off to enable adjustment of the cumulative intensity of illumination provided by the plurality of lights 1012A-1012H.

In accordance with yet another example embodiment, the lights 1012A-1012H may be selectively illuminated to indicate a vector representation of a difference between the recommended position and the position of the portable electronic device. As shown in FIG. 10, light 1012A is illuminated, and lights 1012B-1012H are not illuminated. For example, illumination of light 1012A may indicate that the recommended position is forward and to the left of the position of portable electronic device 1000.

In some other examples, an order in which two or more of the lights 1012A-1012H are illuminated may indicate the vector representation of the difference between the recommended position and the position of the portable electronic device. For instance, consecutively illuminating light 1012H, light 1012G, light 1012F, light 1012D, and light 1012A and/or consecutively illuminating light 1012H, light 1012E, light 1012C, light 1012B, and light 1012A may indicate that the recommended position is forward and to the left of the position of portable electronic device 1000.

In accordance with the examples described above with respect to this embodiment, the lights 1012A-1012H may be configured to indicate a two-dimensional vector representation of the difference between the recommended position and the position of portable electronic device 1000. Alternatively, the lights 1012A-1012H may be configured to indicate a three-dimensional vector representation of the difference between the recommended position and the position of portable electronic device 1000. For example, the intensity of each illuminated light may be set to indicate another dimension of the vector representation. In accordance with this example, illumination of one or more of the lights 1012A-1012H may indicate whether the recommended position is forward, backward, right, left, or some combination thereof with reference to the position of portable electronic device 1000. The illumination intensity of any of the lights 1012A-1012H that are illuminated may indicate whether the recommended position is up or down with reference to the position of portable electronic device 1000.

The example embodiments described above for illuminating light(s) to indicate a magnitude of difference between the position of portable electronic device 1000 and the recommended position are provided for illustrative purposes and are not intended to be limiting. It will be recognized that light(s) may be illuminated in any suitable manner to indicate the magnitude of difference between the position of portable electronic device 1000 and the recommended position with respect to any number of dimensions (e.g., 2, 3, 4, etc.).

As shown in FIG. 10, portable electronic device 1000 includes display 1010. Display 1010 is configured to provide a pictorial representation that indicates the recommended position with reference to the position of portable electronic device 1000 in accordance with instructions received from control logic 1008.

In accordance with an example embodiment, a pictorial vector representation of a difference between the recommended position and the position of portable electronic device 1000 is generated on display 1010. A vector is an element of a vector space. A vector space is a set that is closed under finite vector addition and scalar multiplication. The concept of vectors and vector spaces is generally known in the relevant art(s) and therefore will not be discussed in detail herein.

For example, arrow 1014 is shown in FIG. 10 to be a pictorial vector representation of the difference between the recommended position and the position of portable electronic device 1000. Arrow 1014 is shown with respect to three dimensions for illustrative purposes and is not intended to be limiting. A pictorial vector representation, such as arrow 1014, may represent the difference between the recommended position and the position of portable electronic device 1000 with respect to any number of dimensions.

In accordance with another example embodiment, a pictorial representation of a magnitude of difference between the recommended position and the position of portable electronic device 1000 is generated on display 1010. For example, a plurality of colors may be assigned to a plurality of respective magnitudes of difference between the recommended position and respective potential positions of portable electronic device 1000. In accordance with this example, display 1010 may display a color of the plurality of colors that corresponds to the magnitude of difference between the recommended position and the position of portable electronic device 1000. For instance, the color may change in real-time as a user moves portable electronic device 1000 toward or away from the recommended position.

In another example, a plurality of potential sizes of arrow 1014 may be assigned to a plurality of respective magnitudes of difference between the recommended position and respective potential positions of portable electronic device 1000. In accordance with this example, display 1010 may display arrow 1014 having a size that corresponds to the magnitude of difference between the recommended position and the position of portable electronic device 1000. For instance, the size of arrow 1014 may change in real-time as a user moves portable electronic device 1000 toward or away from the recommended position.

It will be recognized that portable electronic device 1000 may not include one or more of wireless power receipt module 1002, efficiency indicator receipt module 1004, a sensory signal module 1006, control logic 1008, display 1010, and/or lights 1012A-1012H. Furthermore, portable electronic device 1000 may include modules in addition to or in lieu of wireless power receipt module 1002, efficiency indicator receipt module 1004, a sensory signal module 1006, control logic 1008, display 1010, and/or lights 1012A-1012H.

FIG. 11 is a graphical representation of example sensory signals 1102, 1104, and 1106 in accordance with embodiments described herein. Sensory signals 1102, 1104, and 1106 will be discussed with reference to portable electronic device 1000 of FIG. 10 for illustrative purposes, though it will be recognized that the discussion of sensory signals 1102, 1104, and 1106 is not limited to that embodiment. For instance, the discussion of sensory signals 1102, 1104, and 1106 is applicable to any suitable portable electronic device, charging station, and/or technique for using an efficiency indicator to increase efficiency of a wireless power transfer.

As shown in FIG. 11, sensory signals 1102, 1104, and 1106 are depicted in an X-Y plane. The magnitude of each sensory signal 1102, 1104, and 1106 is represented along the Y-axis, and time is represented along a respective X-axis for each of the sensory signals 1102, 1104, and 1106. Sensory signal 1102 has a period, which is labeled as "$\tau$". Sensory signal 1102 is active (a.k.a. high) for a first duration $\Delta t_1$ of the period $\tau$. Sensory signal 1102 is inactive (a.k.a. low) for a second duration $\Delta t_2$ of the period $\tau$. A duty cycle D of sensory signal 1102 may be calculated as the first duration $\Delta t_1$ divided by the period $\tau$.

In accordance with some example embodiments, the duty cycle D of a sensory signal (e.g., sensory signal 1102) that is generated by a portable electronic device (e.g., portable electronic device 1000) corresponds to a magnitude of difference between a recommended position and the position of the portable electronic device. In accordance with these example embodiments, the recommended position is specified by an efficiency indicator that is received by the portable electronic device. For example, a greater duty cycle may correspond to a greater magnitude of difference between the recommended position and the position of the portable electronic device. In another example, a greater duty cycle may correspond to a lesser magnitude of difference between the recommended position and the position of the portable electronic device.

Sensory signal 1104 is shown to have consecutive periods that become shorter with respect to time. The consecutive periods are labeled as $\tau_1$, $\tau_2$, $\tau_3$, $\tau_4$, $\tau_5$, and so on, and the relationship between the periods may be represented as $\tau_1 > \tau_2 > \tau_3 > \tau_4 > \tau_5 > \ldots$. The frequency of sensory signal 1104 is inversely related to the period of sensory signal 1104. Accordingly, it will be recognized that the frequency of sensory signal 1104 increases with respect to time.

In accordance with some example embodiments, the frequency of a sensory signal (e.g., sensory signal 1104) corresponds to proximity between the position of a portable electronic device (e.g., portable electronic device 1000) and the recommended position that is specified by an efficiency indicator that is received by the portable electronic device. In accordance with such embodiments, if a higher frequency corresponds to a lesser proximity between the position of the portable electronic device and the recommended position, sensory signal 1104 as shown in FIG. 11 demonstrates that the proximity is becoming less with respect to time. For instance, a user in possession of the portable electronic device may be moving toward the recommended position.

On the other hand, if a higher frequency corresponds to a greater proximity, sensory signal 1104 as shown in FIG. 11 demonstrates that the proximity between the position of the portable electronic device and the recommended position is becoming greater with respect to time. For instance, a user in possession of the portable electronic device may be moving away from the recommended position.

Sensory signal 1106 is shown to have a magnitude that increases during a third time period $\Delta t_3$ and that decreases during a fourth time period $\Delta t_4$ that occurs after the third time period $\Delta t_3$. In accordance with some example embodiments, the magnitude of a sensory signal (e.g., sensory signal 1106) corresponds to proximity between the position of a portable electronic device (e.g., portable electronic device 1000) and the recommended position that is specified by an efficiency indicator that is received by the portable electronic device. In accordance with such embodiments, if a greater magnitude corresponds to a lesser proximity between the position of the portable electronic device and the recommended position, sensory signal 1106 as shown in FIG. 11 demonstrates that the proximity is becoming less with respect to time. For instance, a user in possession of the portable electronic device may be moving toward the recommended position.

On the other hand, if a greater magnitude corresponds to a greater proximity, sensory signal 1106 as shown in FIG. 11 demonstrates that the proximity between the position of the portable electronic device and the recommended position is becoming greater with respect to time. For instance, a user in possession of the portable electronic device may be moving away from the recommended position.

Sensory signal 1102 is shown to be a digital signal, and sensory signals 1104 and 1106 are shown to be analog signals, for illustrative purposes and are not intended to be limiting. It will be recognized that any of the sensory signals described herein may be digital signals or analog signals.

FIG. 12 depicts a flowchart 1200 of another method for using an efficiency indicator for increasing efficiency of a wireless power transfer in accordance with an embodiment described herein. Flowchart 1200 may be performed by portable electronic device 104, 604, 704, or 804 of respective wireless power transfer system 100, 600, 700, or 800 shown in respective FIG. 1, 6, 7, or 8, for example. For illustrative purposes, flowchart 1200 is described with respect to a portable electronic device 1300 shown in FIG. 13, which is an example of a portable electronic device 104, 604, 704, or 804, according to an embodiment.

As shown in FIG. 13, portable electronic device 1300 includes a wireless power receipt module 1002', an efficiency indicator receipt module 1004', a global positioning system (GPS) module, and a sensory signal module 1006'. In this document, whenever a prime is used to modify a reference number, the modified reference number indicates an example (or alternate) implementation of the element that corresponds to the reference number. Further structural and operational embodiments will be apparent to persons skilled in the relevant art(s) based on the discussion regarding flowchart 1200. Flowchart 1200 is described as follows.

As shown in FIG. 12, the method of flowchart 1200 begins at step 1202. In step 1202, power is wirelessly received at a portable electronic device from a charging station via a wireless power link. The portable electronic device has a position, which corresponds to a first efficiency with respect to receipt of the power. In an example implementation, wireless power receipt module 1002' wirelessly receives the power via the wireless power link.

At step 1204, an efficiency indicator is received at the portable electronic device via a wireless communication link. The efficiency indicator specifies a recommended position of the portable electronic device based on global positioning system (GPS) coordinates of the charging station. The recommended position corresponds to a second efficiency that is greater than the first efficiency with respect to the receipt of the power.

For example, the efficiency indicator may specify a range of GPS coordinates corresponding to the recommended position based on the GPS coordinates of the charging station. For instance, the recommended position may define an area that includes the GPS coordinates of the charging station. In another example, the GPS coordinates of the charging station may serve as the recommended position.

In an example implementation, efficiency indicator receipt module 1004' receives the efficiency indicator. In accordance with one example embodiment, efficiency indicator receipt module 1004' receives the efficiency indicator from the charging station. In accordance with another example embodiment, efficiency indicator receipt module 1004' receives the efficiency indicator from GPS module 1302 of portable electronic device 1300. For instance, GPS module 1302 may be configured to determine the GPS coordinates of the charging station using a lookup table technique in which a lookup table includes an entry that specifies the GPS coordinates of the charging station, a query-response technique in which GPS module 1302 receives the GPS coordinates of the charging station from the charging station or another source in response to GPS module 1302 providing a query for the GPS coordinates, or any other suitable technique.

At step 1206, GPS coordinates of the portable electronic device are determined that represent the position of the portable electronic device. In an example implementation, GPS module 1302 determines the GPS coordinates of the portable electronic device. For example, GPS module 1302 may be configured to perform a GPS position calculation to determine the GPS coordinates of the portable electronic device. In another example, GPS module 1302 may provide a query for the GPS coordinates of the portable electronic device to a source that is configured to calculate the GPS coordinates. In accordance with this example, the portable electronic device may receive the GPS coordinates from the source in response to providing the query to determine the GPS coordinates.

At step 1208, a sensory signal is generated that indicates the recommended position with reference to the GPS coordinates of the portable electronic device. In an example implementation, sensory signal module 1006' generates the sensory signal.

FIG. 14 depicts a flowchart 1400 of yet another method for using an efficiency indicator for increasing efficiency of a wireless power transfer in accordance with an embodiment described herein. Flowchart 1400 may be performed by charging station 102, 602, 702, or 802 of respective wireless power transfer system 100, 600, 700, or 800 shown in respective FIG. 1, 6, 7, or 8, for example. For illustrative purposes, flowchart 1400 is described with respect to a charging system 1500 shown in FIG. 15, which is an example of a charging station 102, 602, 702, or 802, according to an embodiment.

As shown in FIG. 15, charging station 1500 includes a wireless power transfer module 1502, a position indicator receipt module 1504, a comparison module 1506, and an efficiency indicator transmission module 1508. Further structural and operational embodiments will be apparent to persons skilled in the relevant art(s) based on the discussion regarding flowchart 1400. Flowchart 1400 is described as follows.

As shown in FIG. 14, the method of flowchart 1400 begins at step 1402. In step 1402, a wireless power transfer is initiated from a charging station to a portable electronic device via a wireless power link. The wireless power transfer may be performed in accordance with an inductive coupling technique, a resonant inductive coupling technique, or any other suitable technique. In an example implementation, wireless power transfer module 1502 initiates the wireless power transfer via the wireless power link.

At step 1404, a position indicator is received from the portable electronic device at the charging station via a wireless communication link. The position indicator specifies a position of the portable electronic device that corresponds to a first efficiency with respect to the wireless power transfer. For instance, the position indicator may be received via the wireless communication link in accordance with a Near Field Communication (NFC) protocol, a Bluetooth™ protocol, a ZigBee® protocol, an IEEE 802.11 protocol, or any other suitable protocol. The wireless power link and the wireless communication link may be implemented as separate links or as a common link. The wireless power link and the wireless communication link may be inductive links, though the scope of the example embodiments is not limited in this respect. In an example implementation, position indicator receipt module 1504 receives the position indicator via the wireless communication link.

At step 1406, the position of the portable electronic device is compared to a recommended position of the portable electronic device that corresponds to a second efficiency that is greater than the first efficiency with respect to the wireless power transfer. In an example implementation, comparison module 1506 compares the position of the portable electronic device to the recommended position.

At step 1408, an efficiency indicator is provided to the portable electronic device in response to receipt of the position indicator. The efficiency indicator specifies the recommended position as a change of position with reference to the position of the portable electronic device. For instance, the change of position may be based on comparison of the position of the portable electronic device to the recommended position at step 1408. In an example implementation, efficiency indicator transmission module 1508 provides the efficiency indicator to the portable electronic device.

It will be recognized that step 1406 may be omitted from flowchart 1400. If step 1406 is omitted, the efficiency indicator need not necessarily specify the recommended position as a change of position with reference to the position of the portable electronic device, as described with reference to step 1408. For instance, the efficiency indicator may instead specify the recommended position without reference to the position of the portable electronic device.

FIGS. 16 and 17 depict example environments 1600, 1700 in which an efficiency indicator may be used to increase efficiency of a wireless power transfer in accordance with embodiments described herein. In example environment 1600 of FIG. 16, a charging station (e.g., charging station 102, 602, 702, 802, or 1500 shown in respective FIG. 1, 6, 7, 8, or 15) is incorporated in a surface 1602 on which a portable electronic device 1604 may be placed. The charging station that is incorporated in surface 1602 wirelessly transfers power to portable electronic device 1604 via a wireless power link 1606. For example, the charging station may wirelessly transfer the power to portable electronic device 1604 in accordance with an inductive coupling technique, a resonant inductive coupling technique, or any other suitable technique.

Communication occurs between portable electronic device 1604 and the charging station that is incorporated in surface 1602 via a wireless communication link 1608. Wireless power link 1606 and wireless communication link 1608 may be implemented using a common link or separate links.

Surface 1602 is shown in FIG. 16 to be incorporated in a tabletop of a table (e.g., in a restaurant, a home, a hotel room, etc.) for illustrative purposes and is not intended to be limiting. For instance, surface 1602 may be incorporated in an airline seat tray, an armrest or console of an automobile (e.g., a rental car), a desktop of a desk (e.g., in a school, a home, a library, etc.), or any other suitable surface.

In example environment 1700 of FIG. 17, a charging station (e.g., charging station 102, 602, 702, 802, or 1500 shown in respective FIG. 1, 6, 7, 8, or 15) is located in a building 1702 to provide a wireless power hotspot 1710 with respect to the building 1702. A wireless power hotspot (e.g., wireless power hotspot 1710) is a physical location that offers wireless power access to portable electronic devices, such as portable electronic device 1704, via a shared wireless power link (e.g., shared wireless power link 1706).

For example, building 1702 may be a restaurant, a library, a book store, a department store, an airport, a train station, a bus station, a hotel, a hospital, a museum, a coffee shop, a fuel station, a supermarket, or other suitable building. The hotspot provided by the charging station in building 1702 need not necessarily encompass the entire building, though the hotspot may extend beyond the confines of building 1702. For instance, the hotspot may provide wireless power access with respect to at least a portion of a theme park, a recreational vehicle (RV) park, a school campus, etc.

As depicted in FIG. 17, communication occurs between portable electronic device 1704 and the charging station that is located in building 1702 via a wireless communication link 1708. Shared wireless power link 1706 and wireless communication link 1708 may be implemented using a common link or separate links.

The charging station is described with respect to FIG. 17 as being located in building 1702 for illustrative purposes and is not intended to be limiting. Persons skilled in the relevant art(s) will recognize that the charging station need not necessarily be located in a building. For example, the charging station may be attached externally to a building. In another example, the charging station may be included in a structure that is not included in or attached to a building. For instance, the charging station may be located in a field, a park, or any other suitable location.

V. Conclusion

While various embodiments have been described above, it should be understood that they have been presented by way of example only, and not limitation. It will be understood by those skilled in the relevant art(s) that various changes in form and details may be made to the embodiments described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
wirelessly receiving power at a portable electronic device having a position, which corresponds to a first efficiency with respect to receipt of the power, from a charging station via a wireless power link;
determining global positioning system (GPS) coordinates of the portable electronic device that represent the position of the portable electronic device;
receiving an efficiency indicator at the portable electronic device via a wireless communication link, the efficiency indicator specifying a recommended position of the portable electronic device based on GPS coordinates of the charging station that corresponds to a second efficiency that is greater than the first efficiency with respect to the receipt of the power; and
generating a sensory signal that indicates the recommended position with reference to the GPS coordinates of the portable electronic device.

2. The method of claim 1, wherein generating the sensory signal comprises:
generating the sensory signal having a duty cycle that corresponds to a magnitude of difference between the recommended position and the position of the portable electronic device.

3. The method of claim 1, wherein generating the sensory signal comprises:
generating an audio signal having a frequency that corresponds to proximity between the position of the portable electronic device and the recommended position.

4. The method of claim 1, wherein generating the sensory signal comprises:
generating an audio signal having a magnitude that corresponds to proximity between the position of the portable electronic device and the recommended position.

5. The method of claim 1, wherein generating the sensory signal comprises:
illuminating a number of lights that are in contact with the portable electronic device, the number corresponding to a magnitude of difference between the position of the portable electronic device and the recommended position.

6. The method of claim 1, wherein generating the sensory signal comprises:
illuminating one or more lights that are in contact with the portable electronic device to provide illumination having an intensity that corresponds to a magnitude of difference between the position of the portable electronic device and the recommended position.

7. The method of claim 1, wherein generating the sensory signal comprises:
selectively illuminating lights on the portable electronic device to indicate a vector representation of a difference between the recommended position and the position of the portable electronic device.

8. The method of claim 1, wherein generating the sensory signal comprises:
generating a pictorial representation of a magnitude of difference between the recommended position and the position of the portable electronic device on a display of the portable electronic device.

9. The method of claim 1, wherein generating the sensory signal comprises:
generating a pictorial vector representation of a difference between the recommended position and the position of the portable electronic device on a display of the portable electronic device.

10. The method of claim 1, wherein the efficiency indicator specifies a two-dimensional recommended position of the portable electronic device that corresponds to the second efficiency with respect to the receipt of the power.

11. The method of claim 1, wherein the efficiency indicator specifies a three-dimensional recommended position of the portable electronic device that corresponds to the second efficiency with respect to the receipt of the power.

12. The method of claim 1, wherein wirelessly receiving the power is performed in accordance with an inductive coupling technique.

13. The method of claim 1, wherein wirelessly receiving the power is performed in accordance with a resonant inductive coupling technique.

14. A portable electronic device comprising:
a wireless power receipt module configured to wirelessly receive power from a charging station via a wireless power link, the portable electronic device having a position that corresponds to a first efficiency with respect to receipt of the power;
an efficiency indicator receipt module configured to receive an efficiency indicator via a wireless communication link, the efficiency indicator specifying a recommended position of the portable electronic device that corresponds to a second efficiency that is greater than the first efficiency with respect to the receipt of the power;

a global positioning system (GPS) module configured to determine GPS coordinates of the portable electronic device that indicate the position of the portable electronic device and GPS coordinates of the charging station that correspond to the recommended position; and a sensory signal module configured to generate a sensory signal that indicates the recommended position with reference to the position of the portable electronic device from the first position to the second position, wherein the sensory signal module is configured to generate the sensory signal based on a difference between the GPS coordinates of the portable electronic device and the recommended position.

15. The portable electronic device of claim 14, wherein the sensory signal module comprises:
a plurality of lights; and
control logic that is configured to selectively illuminate the lights to generate the sensory signal.

16. The portable electronic device of claim 15, wherein the control logic selectively illuminates the plurality of lights on the portable electronic device to indicate a vector representation of a difference between the recommended position and the position of the portable electronic device.

17. The portable electronic device of claim 14, wherein the sensory signal module comprises:
a display that is configured to display a pictorial representation of a difference between the recommended position and the position of the portable electronic device;
wherein the sensory signal includes the pictorial representation.

18. The portable electronic device of claim 14, wherein the sensory signal module comprises:
a display that is configured to display a pictorial representation of a magnitude of difference between the recommended position and the position of the portable electronic device;
wherein the sensory signal includes the pictorial representation.

19. The portable electronic device of claim 14, wherein the sensory signal module comprises:
a plurality of lights; and
control logic that is configured to illuminate one or more of the plurality of lights to provide illumination having an intensity that corresponds to a magnitude of difference between the position of the portable electronic device and the recommended position.

20. The portable electronic device of claim 14, wherein the sensory signal module comprises:
a plurality of lights; and
control logic that is configured to illuminate a number of the plurality of lights, the number corresponding to a magnitude of difference between the position of the portable electronic device and the recommended position.

21. A method comprising:
initiating a wireless power transfer from a charging station to a portable electronic device via a wireless power link;
receiving a position indicator from the portable electronic device at the charging station via a wireless communication link in response to initiation of the wireless power transfer, the position indicator specifying a position of the portable electronic device that corresponds to a first efficiency with respect to the wireless power transfer; and
providing an efficiency indicator to the portable electronic device in response to receipt of the position indicator, the efficiency indicator specifying a three-dimensional recommended position of the portable electronic device that corresponds to a second efficiency that is greater than the first efficiency with respect to the wireless power transfer.

22. The method of claim 21, further comprising:
comparing the position of the portable electronic device to the recommended position;
wherein the efficiency indicator specifies the recommended position as a change of position with reference to the position of the portable electronic device.

23. The method of claim 21, wherein receiving the position indicator comprises:
receiving the position indicator at the charging station via the wireless communication link in accordance with a Near Field Communication (NFC) protocol, a Bluetooth™ protocol, a ZigBee® protocol, or an IEEE 802.11 protocol.

24. The method of claim 21, wherein the wireless power transfer is performed in accordance with an inductive coupling technique.

25. The method of claim 21, wherein the wireless power transfer is performed in accordance with a resonant inductive coupling technique.

* * * * *

UNITED STATES PATENT AND TRADEMARK OFFICE
CERTIFICATE OF CORRECTION

PATENT NO.         : 8,427,330 B2
APPLICATION NO.    : 12/580353
DATED              : April 23, 2013
INVENTOR(S)        : Pieter Vorenkamp et al.

Page 1 of 1

It is certified that error appears in the above-identified patent and that said Letters Patent is hereby corrected as shown below:

In the Claims

In column 25, line 10, in claim 14, after "device" delete "from the first position to the second position".

Signed and Sealed this
Seventeenth Day of June, 2014

Michelle K. Lee
*Deputy Director of the United States Patent and Trademark Office*